(12) United States Patent
Oliver et al.

(10) Patent No.: US 11,226,598 B2
(45) Date of Patent: Jan. 18, 2022

(54) BUILDING SYSTEM WITH USER PRESENTATION COMPOSITION BASED ON BUILDING CONTEXT

(71) Applicant: Johnson Controls Technology Company, Auburn Hills, MI (US)

(72) Inventors: George R. Oliver, Milwaukee, WI (US); Justin J. Ploegert, Cudahy, WI (US); Karl F. Reichenberger, Mequon, WI (US); Sudhi R. Sinha, Milwaukee, WI (US); Sujith Ebenezer, Milwaukee, WI (US); Youngchoon Park, Brookfield, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 17/086,083

(22) Filed: Oct. 30, 2020

(65) Prior Publication Data

US 2021/0072709 A1 Mar. 11, 2021

Related U.S. Application Data

(63) Continuation-in-part of application No. 16/688,819, filed on Nov. 19, 2019, which is a continuation of
(Continued)

(51) Int. Cl.
*G06F 16/245* (2019.01)
*G05B 13/02* (2006.01)
(Continued)

(52) U.S. Cl.
CPC ..... *G05B 13/0205* (2013.01); *G05B 13/0265* (2013.01); *G05B 13/048* (2013.01);
(Continued)

(58) Field of Classification Search
CPC ............ G05B 13/0205; G05B 13/0265; G05B 13/048; G05B 15/02; G05B 2219/2642;
(Continued)

(56) References Cited

U.S. PATENT DOCUMENTS 6,434,530 B1 * 8/2002 Sloane .................. G06Q 20/20
235/383
6,487,457 B1 11/2002 Hull et al.
(Continued)

FOREIGN PATENT DOCUMENTS

AU 2019226217 A1 11/2020
AU 2019226264 A1 11/2020
(Continued)

OTHER PUBLICATIONS

U.S. Appl. No. 16/549,037, filed Aug. 23, 2019, Johnson Controls Technology Co.
(Continued)

*Primary Examiner* — James E Richardson
(74) *Attorney, Agent, or Firm* — Foley & Lardner LLP

(57) ABSTRACT

A building system includes one or more storage devices having instructions stored thereon that, when executed by one or more processors, cause the one or more processors to receive an unstructured user question from a user device of a user and query a graph database based on the unstructured user question to extract context associated with the unstructured user question from contextual information of a building stored by the graph database, wherein the graph database stores the contextual information of the building through nodes and edges between the nodes, wherein the nodes represent equipment, spaces, people, and events associated building and the edges represent relationships between the equipment, spaces, people, and events. The instructions further cause the one or more processors to retrieve data
(Continued)

from one or more data sources based on the context and compose a presentation based on the retrieved data.

28 Claims, 18 Drawing Sheets

Related U.S. Application Data application No. 16/260,078, filed on Jan. 28, 2019, now Pat. No. 10,505,756, which is a continuation-in-part of application No. 16/048,052, filed on Jul. 27, 2018, now Pat. No. 10,417,451, application No. 17/086,083, which is a continuation-in-part of application No. 16/014,936, filed on Jun. 21, 2018, and a continuation-in-part of application No. 16/008,885, filed on Jun. 14, 2018, said application No. 16/014,936 is a continuation-in-part of application No. 15/586,104, filed on May 3, 2017, which is a continuation of application No. 15/367,167, filed on Dec. 1, 2016, now Pat. No. 9,817,383.

(60) Provisional application No. 62/951,892, filed on Dec. 20, 2019, provisional application No. 62/929,610, filed on Nov. 1, 2019, provisional application No. 62/611,974, filed on Dec. 29, 2017, provisional application No. 62/611,984, filed on Dec. 29, 2017, provisional application No. 62/564,247, filed on Sep. 27, 2017, provisional application No. 62/523,211, filed on Jun. 21, 2017, provisional application No. 62/520,380, filed on Jun. 15, 2017, provisional application No. 62/360,935, filed on Jul. 11, 2016, provisional application No. 62/331,888, filed on May 4, 2016.

(51) Int. Cl.
*G05B 13/04* (2006.01)
*G06F 16/903* (2019.01)
*H04L 12/28* (2006.01)
*G05B 15/02* (2006.01)

(52) U.S. Cl.
CPC ............ *G05B 15/02* (2013.01); *G06F 16/245* (2019.01); *G06F 16/90335* (2019.01); *H04L 12/2814* (2013.01); *G05B 2219/2642* (2013.01)

(58) Field of Classification Search
CPC ............... G06F 16/245; G06F 16/9024; G06F 16/90335; H04L 12/2814
See application file for complete search history.

(56) References Cited

U.S. PATENT DOCUMENTS

| | | | |
|---|---|---|---|
| 6,556,983 B1 * | 4/2003 | Altschuler | G06K 9/6296 706/55 |
| 7,827,230 B2 | 11/2010 | McMahon et al. | |
| 8,085,265 B2 | 12/2011 | Chen et al. | |
| 8,285,744 B2 | 10/2012 | Dorgelo et al. | |
| 8,401,991 B2 | 3/2013 | Wu et al. | |
| 8,489,668 B2 | 7/2013 | Huff et al. | |
| 8,516,016 B2 | 8/2013 | Park et al. | |
| 8,751,487 B2 | 6/2014 | Byrne et al. | |
| 8,903,889 B2 | 12/2014 | Vijaykumar et al. | |
| 8,990,127 B2 | 3/2015 | Taylor | |
| 9,094,385 B2 | 7/2015 | Akyol et al. | |
| 9,170,702 B2 | 10/2015 | Hersche et al. | |
| 9,189,527 B2 | 11/2015 | Park et al. | |
| 9,263,032 B2 | 2/2016 | Meruva | |
| 9,811,249 B2 | 11/2017 | Chen et al. | |
| 9,817,383 B1 | 11/2017 | Sinha et al. | |
| 9,886,478 B2 | 2/2018 | Mukherjee | |
| 9,984,686 B1 | 5/2018 | Mutagi et al. | |
| 10,095,756 B2 | 10/2018 | Park et al. | |
| 10,169,454 B2 | 1/2019 | Ait-Mokhtar et al. | |
| 10,169,486 B2 | 1/2019 | Park et al. | |
| 10,171,297 B2 | 1/2019 | Stewart et al. | |
| 10,171,586 B2 | 1/2019 | Shaashua et al. | |
| 10,225,216 B2 | 3/2019 | Wise et al. | |
| 10,417,245 B2 | 9/2019 | Park et al. | |
| 10,417,451 B2 | 9/2019 | Park et al. | |
| 10,564,993 B2 | 2/2020 | Deutsch et al. | |
| 10,565,844 B2 | 2/2020 | Pourmohammad et al. | |
| 10,573,168 B1 | 2/2020 | Razak et al. | |
| 10,600,263 B2 | 3/2020 | Park et al. | |
| 10,607,478 B1 | 3/2020 | Stewart et al. | |
| 10,760,815 B2 | 9/2020 | Janakiraman et al. | |
| 10,762,475 B2 | 9/2020 | Song et al. | |
| 10,824,120 B2 | 11/2020 | Ahmed | |
| 10,845,771 B2 | 11/2020 | Harvey | |
| 10,921,760 B2 | 2/2021 | Harvey | |
| 10,969,133 B2 | 4/2021 | Harvey | |
| 11,041,650 B2 | 6/2021 | Li et al. | |
| 11,054,796 B2 | 7/2021 | Holaso | |
| 2004/0193420 A1 * | 9/2004 | Kennewick | G06F 16/3329 704/257 |
| 2007/0033005 A1 * | 2/2007 | Cristo | G10L 15/19 704/9 |
| 2007/0203693 A1 | 8/2007 | Estes | |
| 2009/0057427 A1 | 3/2009 | Geadelmann et al. | |
| 2010/0045439 A1 | 2/2010 | Tak et al. | |
| 2011/0047418 A1 | 2/2011 | Drees et al. | |
| 2011/0071685 A1 | 3/2011 | Huneycutt et al. | |
| 2011/0125737 A1 | 5/2011 | Pothering et al. | |
| 2011/0137853 A1 * | 6/2011 | Mackay | G05B 23/0248 706/57 |
| 2011/0218777 A1 | 9/2011 | Chen et al. | |
| 2012/0029656 A1 | 2/2012 | Colombo et al. | |
| 2012/0062577 A1 | 3/2012 | Nixon | |
| 2012/0166497 A1 | 6/2012 | Choi et al. | |
| 2012/0194502 A1 | 8/2012 | Smith et al. | |
| 2013/0055115 A1 | 2/2013 | Obitko et al. | |
| 2013/0283172 A1 * | 10/2013 | Cross, Jr. | G06F 3/0484 715/733 |
| 2013/0297078 A1 | 11/2013 | Kolavennu | |
| 2013/0325997 A1 | 12/2013 | Higgins et al. | |
| 2013/0338970 A1 | 12/2013 | Reghetti | |
| 2013/0345880 A1 | 12/2013 | Asmus | |
| 2014/0122077 A1 * | 5/2014 | Nishikawa | G10L 17/00 704/249 |
| 2014/0142895 A1 | 5/2014 | Sharma et al. | |
| 2014/0330435 A1 | 11/2014 | Stoner et al. | |
| 2015/0053779 A1 | 2/2015 | Adamek et al. | |
| 2015/0053781 A1 | 2/2015 | Nelson et al. | |
| 2015/0113462 A1 | 4/2015 | Chen et al. | |
| 2015/0120926 A1 | 4/2015 | Wells et al. | |
| 2015/0241895 A1 | 8/2015 | Lu et al. | |
| 2016/0006569 A1 | 1/2016 | Akyol et al. | |
| 2016/0075016 A1 | 3/2016 | Laurent et al. | |
| 2016/0148422 A1 | 5/2016 | Direkwut | |
| 2016/0187896 A1 | 6/2016 | Jones et al. | |
| 2016/0247129 A1 | 8/2016 | Song et al. | |
| 2016/0260063 A1 | 9/2016 | Harris et al. | |
| 2016/0350364 A1 | 12/2016 | Anicic et al. | |
| 2016/0357521 A1 | 12/2016 | Zhang et al. | |
| 2016/0378080 A1 | 12/2016 | Uppala et al. | |
| 2017/0017221 A1 | 1/2017 | Lamparter et al. | |
| 2017/0038753 A1 | 2/2017 | Shah et al. | |
| 2017/0052536 A1 | 2/2017 | Warner et al. | |
| 2017/0053441 A1 | 2/2017 | Nadumane et al. | |
| 2017/0230930 A1 | 8/2017 | Frey | |
| 2017/0315697 A1 | 11/2017 | Jacobson et al. | |
| 2017/0316061 A1 | 11/2017 | Hubauer et al. | |
| 2017/0322534 A1 | 11/2017 | Sinha et al. | |
| 2017/0329867 A1 * | 11/2017 | Lindsley | G06N 20/00 |
| 2017/0351957 A1 | 12/2017 | Lecue et al. | |
| 2017/0357490 A1 | 12/2017 | Park et al. | |
| 2018/0024520 A1 | 1/2018 | Sinha et al. | |
| 2018/0114140 A1 | 4/2018 | Chen et al. | |
| 2018/0176241 A1 | 6/2018 | Manadhata et al. | |

(56) References Cited

U.S. PATENT DOCUMENTS

| | | |
|---|---|---|
| 2018/0198627 A1 | 7/2018 | Mullins |
| 2018/0203961 A1 | 7/2018 | Aisu et al. |
| 2018/0232422 A1 | 8/2018 | Park et al. |
| 2018/0232423 A1 | 8/2018 | Park et al. |
| 2018/0275625 A1 | 9/2018 | Park et al. |
| 2018/0292797 A1 | 10/2018 | Lamparter et al. |
| 2018/0299840 A1 | 10/2018 | Sinha et al. |
| 2018/0309818 A1 | 10/2018 | Park et al. |
| 2018/0313561 A1 | 11/2018 | Sinha et al. |
| 2018/0315299 A1 | 11/2018 | Subramanian et al. |
| 2018/0315300 A1 | 11/2018 | Subramanian et al. |
| 2018/0341255 A1 | 11/2018 | Turney et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0017719 A1 | 1/2019 | Sinha et al. |
| 2019/0025771 A1 | 1/2019 | Park et al. |
| 2019/0042988 A1 | 2/2019 | Brown et al. |
| 2019/0095820 A1 | 3/2019 | Pourmohammad |
| 2019/0095821 A1 | 3/2019 | Pourmohammad |
| 2019/0096014 A1 | 3/2019 | Pourmohammad et al. |
| 2019/0096212 A1 | 3/2019 | Pourmohammad et al. |
| 2019/0096213 A1 | 3/2019 | Pourmohammad et al. |
| 2019/0096214 A1 | 3/2019 | Pourmohammad |
| 2019/0121807 A1 | 4/2019 | Jethwa et al. |
| 2019/0123931 A1 | 4/2019 | Schuster et al. |
| 2019/0129403 A1 | 5/2019 | Turney et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0243352 A1 | 8/2019 | Horgan et al. |
| 2019/0243813 A1 | 8/2019 | Pourmohammad et al. |
| 2019/0271978 A1 | 9/2019 | Elbsat et al. |
| 2019/0295034 A1 | 9/2019 | Wenzel et al. |
| 2019/0311332 A1 | 10/2019 | Turney et al. |
| 2019/0325368 A1 | 10/2019 | Turney et al. |
| 2019/0347622 A1 | 11/2019 | Elbsat et al. |
| 2019/0355240 A1 | 11/2019 | Razak et al. |
| 2019/0361412 A1 | 11/2019 | Park et al. |
| 2019/0377306 A1 | 12/2019 | Harvey |
| 2019/0383510 A1 | 12/2019 | Murugesan et al. |
| 2019/0384239 A1 | 12/2019 | Murugesan et al. |
| 2019/0385070 A1 | 12/2019 | Lee et al. |
| 2020/0073342 A1 | 3/2020 | Lee et al. |
| 2020/0076196 A1 | 3/2020 | Lee et al. |
| 2020/0092127 A1 | 3/2020 | Park et al. |
| 2020/0106633 A1 | 4/2020 | Park et al. |
| 2020/0336328 A1 | 10/2020 | Harvey |
| 2020/0348632 A1 | 11/2020 | Harvey |
| 2020/0387576 A1 | 12/2020 | Brett et al. |
| 2020/0396208 A1 | 12/2020 | Brett et al. |
| 2021/0043221 A1 | 2/2021 | Yelchuru et al. |
| 2021/0056386 A1 | 2/2021 | Murugesan et al. |
| 2021/0056409 A1 | 2/2021 | Murugesan et al. |
| 2021/0056452 A1 | 2/2021 | Murugesan et al. |
| 2021/0325070 A1 | 10/2021 | Endel et al. |
| 2021/0342961 A1 | 11/2021 | Winter et al. |

FOREIGN PATENT DOCUMENTS

| | | |
|---|---|---|
| AU | 2019351573 A1 | 5/2021 |
| CN | 106406806 A | 2/2017 |
| CN | 107598928 A | 1/2018 |
| EP | 3 324 306 A1 | 5/2018 |
| EP | 3268821 B1 | 7/2020 |
| WO | WO-2007/125108 A1 | 11/2007 |
| WO | 2018132112 A1 | 7/2018 |
| WO | 2020061621 A1 | 4/2020 |

OTHER PUBLICATIONS

U.S. Appl. No. 16/549,656, filed Aug. 23, 2019, Johnson Controls Technology Co.

U.S. Appl. No. 16/549,744, filed Aug. 23, 2019, Johnson Controls Technology Co.

Balaji et al, "Brick: Towards a Unified Metadata Schema for Buildings," dated Nov. 16-17, 2016, 10 pages.

Balaji et al, Brick: Metadata schema for portable smart building applications, dated Sep. 25, 2017, 20 pages.

Brick: Metadata schema for portable smart building applications, dated Sep. 15, 2018, 3 pages, (Abstract).

Koh et al., "Scrabble: Transferrable Semi-Automated Semantic Metadata Normalization using Intermediate Representation," dated Nov. 7-8, 2018, 10 pages.

International Search Report and Written Opinion on PCT/US2020/058381, dated Jan. 27, 2021, 30 pages.

International Search Report and Written Opinion of PCT/US2017/013647 dated Apr. 18, 2017 (10 pages).

\* cited by examiner

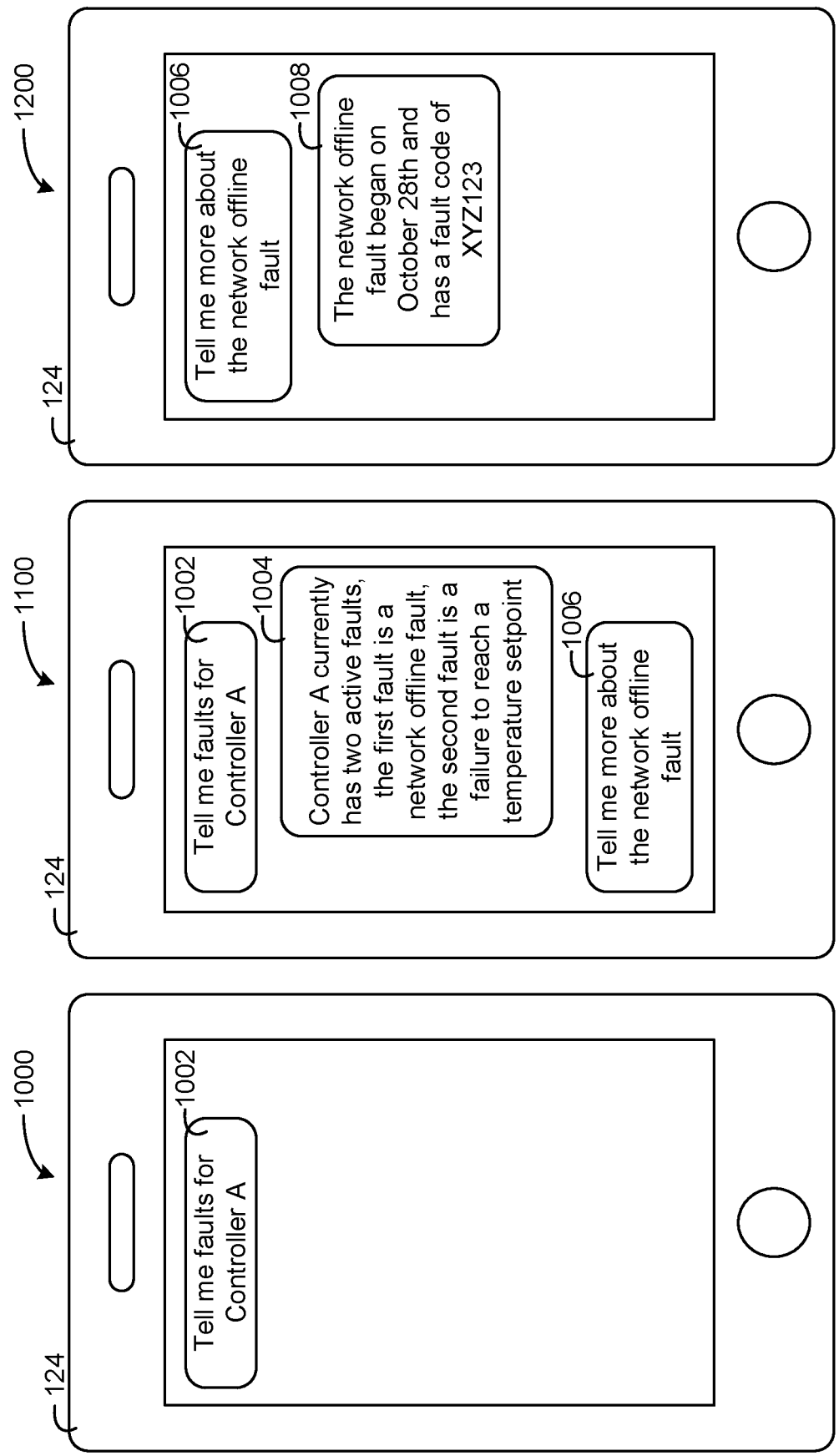

BUILDING SYSTEM WITH USER PRESENTATION COMPOSITION BASED ON BUILDING CONTEXT

CROSS-REFERENCE TO RELATED PATENT APPLICATIONS

This application claims the benefit of and priority to U.S. Provisional Patent Application No. 62/951,892 filed Dec. 20, 2019 and U.S. Provisional Patent Application No. 62/929,610 filed Nov. 1, 2019. This application is also a continuation-in-part of U.S. patent application Ser. No. 16/008,885 filed Jun. 14, 2018 which claims the benefit of and priority to U.S. Provisional Patent Application No. 62/520,380 filed Jun. 15, 2017. This application is also a continuation-in-part of U.S. patent application Ser. No. 16/014,936 filed Jun. 21, 2018 which claims the benefit of and priority to U.S. Provisional Patent Application No. 62/523,211 filed Jun. 21, 2017. U.S. patent application Ser. No. 16/014,936 filed Jun. 21, 2018 is also a continuation-in-part of U.S. patent application Ser. No. 15/586,104 filed May 3, 2017 which claims the benefit of and priority to U.S. Provisional Patent Application No. 62/331,888 filed May 4, 2016. U.S. patent application Ser. No. 15/586,104 filed May 3, 2017 is a continuation of U.S. patent application Ser. No. 15/367,167 filed Dec. 1, 2016 which claims the benefit of U.S. Provisional Patent Application No. 62/360,935 filed Jul. 11, 2016. This application is also a continuation-in-part of U.S. patent application Ser. No. 16/688,819 filed Nov. 19, 2019 which is a continuation of U.S. patent application Ser. No. 16/260,078 filed Jan. 28, 2019 which is a continuation-in-part of U.S. patent application Ser. No. 16/048,052 filed Jul. 27, 2018 which claims the benefit of and priority to U.S. Provisional Patent Application No. 62/564,247 filed Sep. 27, 2017, U.S. Provisional Patent Application No. 62/611,974 filed Dec. 29, 2017, and U.S. Provisional Patent Application No. 62/611,984 filed Dec. 29, 2017. The entirety of each of these patent applications is incorporated by referenced herein.

BACKGROUND

The present disclosure relates generally to building management systems. The present disclosure relates more particularly to data analytics and information presentation of the building management system.

Many building management systems include a user interface application. The user interface application is run on top of data analytics algorithms that generate data for presentation in the user interface application. Both the user interface application and the data analytics are designed by a developer. Once deployed, the one or more data analytics and the user interface application operate in a static, predefined manner until they are updated by the developer. The data analytics and user interface applications meet a design goal instead of dynamically meeting the needs or preferences of a user who may be interacting with the user interface application. More specifically, the user interface application only presents the information that the developer has designed it to present, the user interface application cannot, by itself, change based on the interest of the user, contextual information describing the user, or context information describing a building.

SUMMARY

One implementation of the present disclosure is a building system including one or more storage devices having instructions stored thereon that, when executed by one or more processors, cause the one or more processors to receive an unstructured user question from a user device of a user and query a graph database based on the unstructured user question to extract context associated with the unstructured user question from contextual information of a building stored by the graph database, wherein the graph database stores the contextual information of the building through a plurality of nodes and a plurality of edges between the plurality of nodes, wherein the plurality of nodes represent building entities of the building and the plurality of edges represent relationships between the building entities. The instructions cause the one or more processors to retrieve building data from one or more data sources based on the context and compose a presentation based on the building data.

Another implementation of the present disclosure is a building system including one or more storage devices having instructions stored thereon that, when executed by one or more processors, cause the one or more processors to receive an unstructured user question from a user device of a user, query a graph database based on the unstructured user question to extract context associated with the unstructured user question from contextual information of a building stored by the graph database, wherein the graph database stores the contextual information of the building through a plurality of nodes and a plurality of edges between the plurality of nodes, wherein the plurality of nodes represent equipment, spaces, people, and events associated with the building and the plurality of edges represent relationships between the equipment, spaces, people, and events, wherein the one or more processors are configured to extract the context for multiple portions of the unstructured user question across two or more of the equipment, spaces, people, or events. The instructions cause the one or more processors to retrieve data from one or more data sources based on the context to generate a response to the user question and compose a presentation based on the retrieved data.

In some embodiments, the one or more data sources are one or more particular nodes of the graph database.

In some embodiments, the instructions cause the one or more processors to implement a data ingestion service configured to collect the data from an edge device of the building and ingest the data into the graph database, the graph database, wherein the graph database is configured to store the data, and a dynamic user experience service configured to receive the unstructured user question, query the graph database, and compose the presentation.

In some embodiments, the unstructured user question is a string. In some embodiments, the instructions cause the one or more processors to decompose the string to determine a requested information context and a presentation context based on the string, query the graph database for the data of the building based on the requested information context, and compose the presentation based on the data and the presentation context by determining a format of the presentation based on the presentation context.

In some embodiments, the plurality of nodes represent the building data.

In some embodiments, the unstructured user question is a string including an identifier of an edge device associated with the data and an indication of a type of the data. In some embodiments, the instructions cause the one or more processors to decompose the string to determine a first component and a second component of the string, wherein the first component is the identifier of the edge device associated with the data and the second component is the type of the data, query the graph database for the building data of the building with the first component and the second component.

In some embodiments, the unstructured user question is a string including an indication of a requested output presentation, wherein the requested output presentation is at least one of a visual output presentation, a textual output presentation, or an audible output presentation. In some embodiments, the instructions cause the one or more processors to decompose the string to determine a component of the string, wherein the component is the indication of the requested output presentation and compose the presentation based on the component of the string by determining whether the component indicates the visual output presentation, the textual output presentation, or the audible output presentation, composing the presentation as the visual output presentation in response to a first determination that the component indicates the visual output presentation, composing the presentation as the text output presentation in response to a second determination that the component indicates the text output presentation, and composing the presentation as the audible output presentation in response to a third determination that the component indicates the audible output presentation.

In some embodiments, the instructions cause the one or more processors to query the graph database for at least a portion of the data and a context portion of the contextual information describing the building, perform one or more analytic algorithms based on the portion of the data and the context portion of the contextual information to generate one or more analytics results, and push the one or more analytics results to the user device of the user.

In some embodiments, the instructions cause the one or more processors to retrieve at least one of historical question data associated with the user or user contextual data describing the user and select the one or more analytic algorithms from a plurality of analytic algorithms based on at least one of the historical question data associated with the user or the user contextual data describing the user.

In some embodiments, the unstructured user question is a string. In some embodiments, the instructions cause the one or more processors to decompose the string to determine a requested information context and a presentation context, query the graph database for the context based on the requested information context, generate a query data structure based on the context, query the graph database based on the query data structure for the data of the building, and compose the presentation based on the data and the presentation context.

In some embodiments, the requested information context includes a request for one or more actions associated with the user of the user device, wherein the requested information context further includes an indication of the user.

In some embodiments, the context includes at least one of one or more particular nodes of the graph database or one or more particular edges of the graph database. In some embodiments, the instructions cause the one or more processors to generate the query data structure by causing the query data structure to include one or more parameters based on at least one of the one or more particular nodes of the graph database or the one or more particular edges of the graph database.

In some embodiments, the instructions cause the one or more processors to receive an indication of the data being ingested into the graph database, determine, based on the data, that a presentation rule of a plurality of presentation rules is triggered based on the data, query the graph database based on the presentation rule and the data to identify the user, compose a second presentation based on the data and the presentation rule, and push the second presentation to the user device of the user.

In some embodiments, the instructions cause the one or more processors to retrieve historical question data based on an identity of the user, identify one or more presentation preferences of the user based on the historical question data, and compose the second presentation based on the data, the presentation rule, and the one or more presentation preferences.

In some embodiments, the instructions cause the one or more processors to compose the second presentation based on the data and the presentation rule by selecting one presentation template from a plurality of presentation templates based on the data and the presentation rule, wherein each of the plurality of presentation templates defines a presentation format and composing the second presentation based on the data and the one presentation template.

Another implementation of the present disclosure is a method including receiving, by a processing circuit, an unstructured user question from a user device of a user, querying, by the processing circuit, a graph database based on the unstructured user question to extract context associated with the unstructured user question from contextual information of a building stored by the graph database, wherein the graph database stores the contextual information of the building through a plurality of nodes and a plurality of edges between the plurality of nodes, wherein the plurality of nodes represent building entities of the building and the plurality of edges represent relationships between the building entities, retrieving, by the processing circuit, building data from one or more data sources based on the context, and composing, by the processing circuit, a presentation based on the building data.

Another implementation of the present disclosure is a method including receiving, by a processing circuit, an unstructured user question from a user device of a user and querying, by the processing circuit, a database based on the unstructured user question to extract context associated with the unstructured user question from contextual information of a building stored by the database, wherein the database stores the contextual information of the building through a plurality of nodes and a plurality of edges between the plurality of nodes, wherein the plurality of nodes represent equipment, spaces, people, and events associated with the building and the plurality of edges represent relationships between the equipment, spaces, people, and events, wherein the querying includes extracting the context for multiple portions of the unstructured user question across two or more of the equipment, spaces, people, or events. The method further includes retrieving, by the processing circuit, data from one or more data sources based on the context to generate a response to the user question and composing, by the processing circuit, a presentation based on the retrieved data.

In some embodiments, the unstructured user question is a string. In some embodiments, the method further includes decomposing, by the processing circuit, the string to determine a requested information context and a presentation context based on the string, querying, by the processing circuit, the database for the data of the building based on the requested information context, and composing, by the processing circuit, the presentation based on the data and the presentation context by determining a format of the presentation based on the presentation context.

In some embodiments, the plurality of nodes represent the data.

In some embodiments, the database is a graph database. In some embodiments, the one or more data sources are one or more particular nodes of the graph database.

In some embodiments, the unstructured user question is a string including an identifier of an edge device associated with the data and an indication of a type of the data. In some embodiments, the method further includes decomposing, by the processing circuit, the string to determine a first component and a second component of the string, wherein the first component is the identifier of the edge device associated with the data and the second component is the type of the data and querying, by the processing circuit, the database for the data of the building with the first component and the second component.

In some embodiments, the unstructured user question is a string including an indication of a requested output presentation, wherein the requested output presentation is at least one of a visual output presentation, a textual output presentation, or an audible output presentation. In some embodiments, the method further includes decomposing, by the processing circuit, the string to determine a component of the string, wherein the component is the indication of the requested output presentation and composing, by the processing circuit, the presentation based on the component of the string by determining whether the component indicates the visual output presentation, the textual output presentation, or the audible output presentation, composing the presentation as the visual output presentation in response to a first determination that the component indicates the visual output presentation, composing the presentation as the text output presentation in response to a second determination that the component indicates the text output presentation, and composing the presentation as the audible output presentation in response to a third determination that the component indicates the audible output presentation.

In some embodiments, the method further includes querying, by the processing circuit, the database for at least a portion of the data and a context portion of the contextual information describing the building, performing, by the processing circuit, one or more analytic algorithms based on the portion of the data and the context portion of the contextual information to generate one or more analytics results, and pushing, by the processing circuit, the one or more analytics results to the user device of the user.

In some embodiments, the method further includes retrieving, by the processing circuit, at least one of historical question data associated with the user or user contextual data describing the user and selecting, by the processing circuit, the one or more analytic algorithms from a plurality of analytic algorithms based on at least one of the historical question data associated with the user or the user contextual data describing the user.

In some embodiments, the unstructured user question is a string. In some embodiments, the method further includes decomposing, by the processing circuit, the string to determine a requested information context and a presentation context, querying, by the processing circuit, the database for the context based on the requested information context, generating, by the processing circuit, a query data structure based on the context, querying, by the processing circuit, the database based on the query data structure for the data of the building, and composing, by the processing circuit, the presentation based on the data and the presentation context.

In some embodiments, the requested information context includes a request for one or more actions associated with the user of the user device, wherein the requested information context further includes an indication of the user.

In some embodiments, the context includes at least one of one or more particular nodes of the database or one or more particular edges of the database. In some embodiments, the method further includes generating, by the processing circuit, the query data structure by causing the query data structure to include one or more parameters based on at least one of the one or more particular nodes of the database or the one or more particular edges of the database.

In some embodiments, the method further includes receiving, by the processing circuit, an indication of the data being ingested into the database, determining, by the processing circuit, based on the data, that a presentation rule of a plurality of presentation rules is triggered based on the data, querying, by the processing circuit, the database based on the presentation rule and the data to identify the user, composing, by the processing circuit, a second presentation based on the data and the presentation rule, and pushing, by the processing circuit, the second presentation to the user device of the user.

In some embodiments, the method includes retrieving, by the processing circuit, historical question data based on an identity of the user, identifying, by the processing circuit, one or more presentation preferences of the user based on the historical question data, and composing, by the processing circuit, the second presentation based on the data, the presentation rule, and the one or more presentation preferences.

In some embodiments, the method includes composing, by the processing circuit, the second presentation based on the data and the presentation rule includes selecting one presentation template from a plurality of presentation templates based on the data and the presentation rule, wherein each of the plurality of presentation templates defines a presentation format and composing the second presentation based on the data and the one presentation template.

Another implementation of the present disclosure is a building management system of a building including one or more storage devices configured to store instructions and store a knowledgebase including contextual information of the building, wherein the contextual information includes representations of equipment, spaces, people, and events associated with the building and relationships between the equipment, spaces, people, and events. The system includes one or more processing circuits configured to execute the instructions causing the one or more processing circuits to receive an unstructured user question from a user device of a user, query the knowledgebase based on the unstructured user question to extract context associated with the unstructured user question from the contextual information of the building stored by the knowledgebase, wherein the one or more processors are configured to extract the context for multiple portions of the unstructured user question across two or more of the equipment, spaces, people, or events, retrieve data from the knowledgebase based on the context to generate a response to the user question, and compose a presentation based on the retrieved data.

Another implementation of the present disclosure is a building management system a building including one or more storage devices configured to store instructions and store a knowledgebase including contextual information of the building, wherein the contextual information includes representations of building entities of the building and relationships between the building entities and one or more processing circuits. The one or more processing circuits are configured to execute the instructions causing the one or more processing circuits to receive an unstructured user question from a user device of a user, query the knowledgebase based on the unstructured user question to extract context associated with the unstructured user question from the contextual information of the building stored by the knowledgebase, retrieve building data from the knowledgebase based on the context, and compose a presentation based on the building data.

In some embodiments, the knowledgebase is a graph database including a plurality of nodes representing the building entities and a plurality of edges between the plurality of nodes representing the relationships. In some embodiments, the plurality of nodes represent equipment, spaces of the building, people, and the building data.

In some embodiments, the knowledgebase is a digital twin that provides a virtual representation of the equipment, spaces, people, and events associated with the building.

Pull—Responding to User Questions by Querying a Knowledgebase Based on User Input One implementation of the present disclosure is a building management system of a building including one or more memory devices configured to store instructions thereon, that, when executed by the one or more processing circuits, cause the one or more processing circuits to implement a data ingestion service configured to collect building data from an edge device of the building and ingest the building data into a knowledgebase. The instructions further cause the one or more processing circuits to implement the knowledgebase, wherein the knowledgebase is configured to store the building data. The instructions further cause the one or more processing circuits to implement an dynamic user experience service configured to receive user input from a user device, wherein the user input is a string, decompose the string to determine a requested information context and a presentation context based on the string, query the knowledgebase for the building data of the building based on the requested information context, and compose a presentation based on the building data and the presentation context, wherein the dynamic user experience service determines a format of the presentation based on the presentation context.

In some embodiments, the knowledgebase is a graph data structure including nodes and edges. In some embodiments, the nodes represent equipment, spaces of the building, people, and the building data. In some embodiments, the edges represent relationships between at least some of the equipment, the spaces of the building, the people, and the building data.

In some embodiments, the string includes an identifier of the edge device and an indication of a type of the building data. In some embodiments, the dynamic user experience service is configured to decompose the string to determine a first component and a second component of the string, wherein the first component is the identifier of the edge device and the second component is the type of the building data query the knowledgebase for the building data of the building with the first component and the second component.

In some embodiments, the dynamic user experience service is configured to receive a second user input from the user device, wherein the second user input is a second string, decompose the second user input to determine follow-on context for a question associated with the presentation and a second presentation context, and compose a second presentation based on the building data, the follow-on context, and the second presentation context, wherein the dynamic user experience service determines a second format of the second presentation based on the second presentation context.

In some embodiments, the string includes an indication of a requested output presentation, wherein the output presentation is at least one of a request for a visual output presentation or a request for a text output presentation. In some embodiments, the dynamic user experience service is configured to decompose the string to determine a component of the string, wherein the component is the indication of the requested output presentation, compose the presentation based on the component of the string by determining whether the component is the request for the visual output presentation or the request for the text output presentation, compose the presentation as a visual output presentation in response to a determination that the component is the request for the visual output presentation, and compose the presentation as a text output presentation in response to a determination that the component is the request for the text output presentation.

In some embodiments, the dynamic user experience service further composes the presentation by generating an audio output based on the text output presentation.

Pull—Responding to User Questions by Generating Contextual Building Queries for a Building Knowledgebase One implementation of the present disclosure is a building management system of a building including one or more memory devices configured to store instructions thereon, that, when executed by the one or more processing circuits, cause the one or more processing circuits to implement a data ingestion service configured to collect building data from an edge device of the building and ingest the building data into a knowledgebase. The instructions cause the one or more processing circuits to implement the knowledgebase, wherein the knowledgebase is configured to store the building data and contextual information describing the building. The instructions cause the one or more processing circuits to implement an dynamic user experience service configured to receive user input from a user device, wherein the user input is a string, decompose the string to determine a requested information context and a presentation context, query the knowledgebase for a portion of the contextual information of the building based on the requested information context, generate a query data structure based on the portion of the contextual information, query the knowledgebase based on the query data structure for the building data of the building, and compose a presentation based on the building data and the presentation context.

In some embodiments, the requested information context includes a request for one or more actions associated with a user of the user device, wherein the requested information context further includes an indication of the user.

In some embodiments, the string includes an indication of a requested output presentation, wherein the output presentation is at least one of a request for a visual output presentation or a request for a text output presentation. In some embodiments, the dynamic user experience service is configured to decompose the string to determine a component of the string, wherein the component is the indication of the requested output presentation and compose the presentation based on the component of the string by determining whether the component is the request for the visual output presentation or the request for the text output presentation, compose the presentation as a visual output presentation in response to a determination that the component is the request for the visual output presentation, and compose the presentation as a text output presentation in response to a determination that the component is the request for the text output presentation.

In some embodiments, the knowledgebase is a graph data structure including nodes and edges. In some embodiments, the nodes represent equipment, spaces of the building, people, and the building data. In some embodiments, the edges represent relationships between at least some of the equipment, the spaces of the building, the people, and the building data.

In some embodiments, the portion of the contextual information includes at least one of one or more particular nodes of the graph data structure or one or more particular edges of the graph data structure. In some embodiments, the dynamic user experience service is configured to generate the query data structure by causing the query data structure to include one or more parameters based on at least one of the one or more particular nodes or the one or more particular edges.

In some embodiments, the query data structure includes a first parameter associated with the building data to return for the query data structure and a second parameter associated with second data to return for the query data structure. In some embodiments, the dynamic user experience service is configured to query the knowledgebase based on the query data structure for the building data and the second data and compose the presentation based on the building data, the second data, and the presentation context.

In some embodiments, the second data is contextual user data describing a user of the user device.

Push—Triggering Presentation to a User

Another implementation of the present application is a building management system of a building including one or more memory devices configured to store instructions thereon, that, when executed by the one or more processing circuits, cause the one or more processing circuits to implement a data ingestion service configured to collect building data from an edge device of the building and ingest the building data into a knowledgebase. The instructions cause the one or more processing circuits to implement the knowledgebase, wherein the knowledgebase is configured to store the building data and contextual information describing the building. The instructions cause the one or more processing circuits to implement a dynamic user experience service configured to receive an indication of the building data being ingested into the knowledgebase, determine, based on the building data, that a presentation rule of presentation rules is triggered based on the building data, query the knowledgebase based on the presentation rule and the building data to identify a user, compose a presentation based on the building data and the presentation rule, and push the presentation to a user device of the user.

In some embodiments, the dynamic user experience service is configured to retrieve historical question data based on an identity of the user, identify on or more presentation preferences of the user based on the historical question data, and compose the presentation based on the building data, the presentation rule, and the presentation preferences.

In some embodiments, the knowledgebase is a graph data structure including nodes and edges. In some embodiments, the nodes represent equipment, spaces of the building, people, and the building data. In some embodiments, the edges represent relationships between at least some of the equipment, the spaces of the building, the people, and the building data.

In some embodiments, the dynamic user experience service is configured to compose the presentation based on the building data and the presentation rule by selecting one presentation template from presentation templates based on the building data and the presentation rule, wherein each of the presentation templates defines a presentation format and composing the presentation based on the building data and the one presentation template.

In some embodiments, the dynamic user experience service is configured to receive a user input from the user device, wherein the user input is a string, decompose user input to determine a follow-on context for a question associated with the presentation and a second presentation context, and compose a second presentation based on the building data, the follow-on context, and the second presentation context, wherein the dynamic user experience service determines a format of the second presentation based on the second presentation context.

In some embodiments, the dynamic user experience service is configured to query the knowledgebase for at least a portion of the building data and a portion of the contextual information describing the building, perform one or more analytic algorithms based on the portion of the building data and the portion of the contextual information to generate one or more analytics results, and push the one or more analytics results to the user device of the user.

In some embodiments, the dynamic user experience service is configured to retrieve at least one of historical question data associate with the user or user contextual data describing the user and select the one or more analytic algorithms from analytic algorithms based on at least one of the historical question data associated with the user or the user contextual data describing the user.

In some embodiments, the one or more analytics results are associated with a building system. In some embodiments, the dynamic user experience service is configured to identify the user by querying the knowledgebase based on the building system, wherein the user is linked to the building system by the knowledgebase.

In some embodiments, the dynamic user experience service is configured to perform one or more analytic algorithms by operating a building equipment model of building equipment based on operating settings for the building equipment, wherein the building equipment model provides result data for each of the operating settings and selecting one operating setting of the operating settings based on the result data for each of the operating settings, wherein the one or more analytic results include the one operating setting.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIGS. 10-12 are examples of a conversation between the user via the user device and the dynamic UX service illustrating the question of FIG. 3 and the response composed for the question of FIG. 3 by the dynamic UX service, according to an exemplary embodiment.

DETAILED DESCRIPTION

Figure 1:
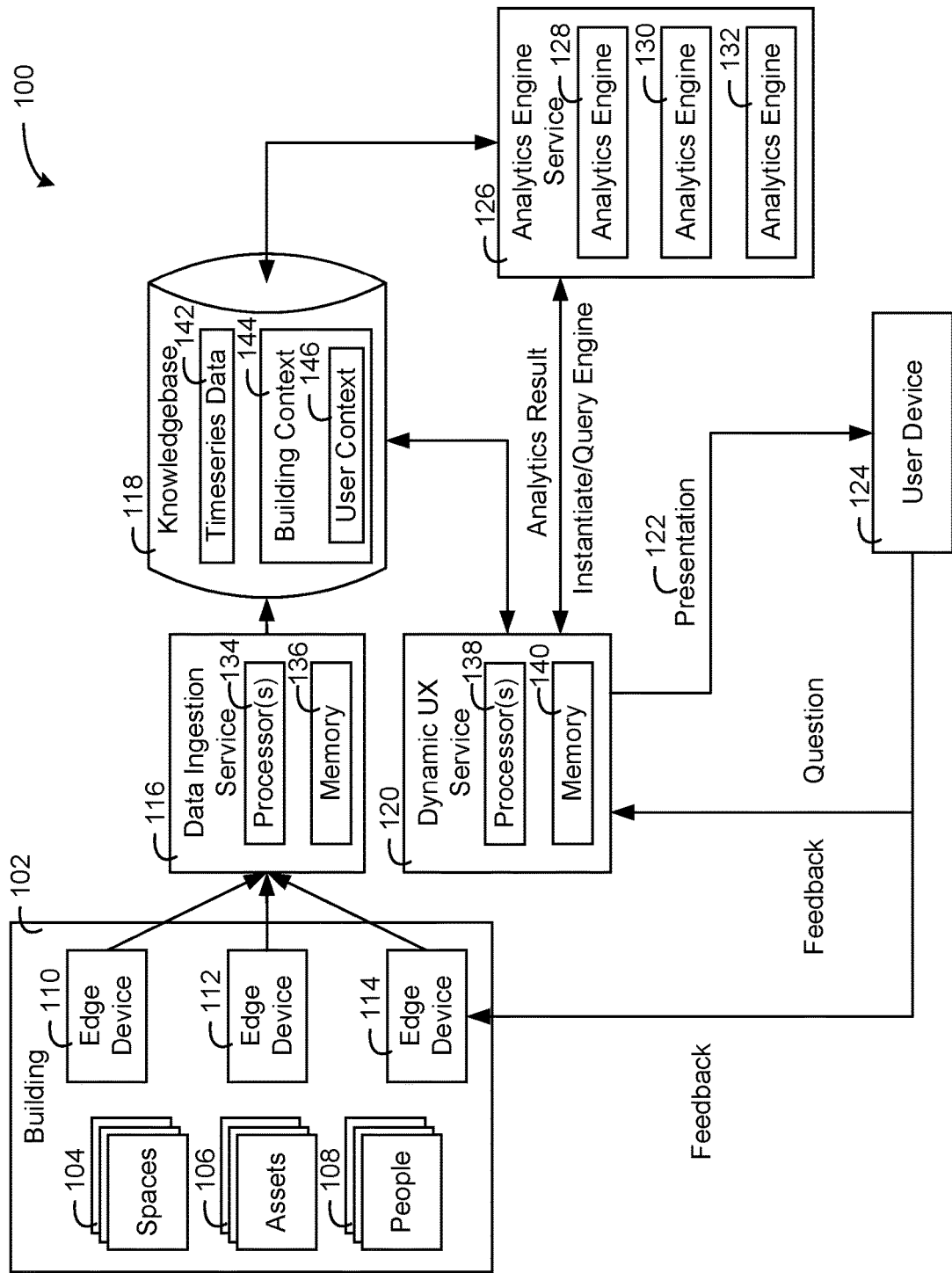
FIG. 1 is a block diagram of a UI-less UX system of a building including a dynamic user experience (UX) service and a knowledgebase, where the UI-less UX system receives user questions from a user device of a user and composes responses for presentation to the user via the user device, according to an exemplary embodiment.

Referring generally to the FIGURES, a building system with user presentation composition based on building context is shown, according to various exemplary embodiments. The building system can be configured to receive unstructured user questions, i.e., questions provided by the user in a textual form or spoken form. These user questions can describe information that the user is interested in and the type of presentation that the user desires to view the information in. In this regard, the building system can identify, based on components of the user question that describe the information, the information that the user wishes to receive. Furthermore, based on components of the user question that describe the preferred presentation format, the system can compose a response based on the information and provide the composed response to a user via a user device.

In some embodiments, the questions asked by the user need to be interpreted with contextual information of a building. For example, the questions, by themselves, may not include enough information to identify the information that the user is seeking. In this regard, the building system can utilize a building knowledge graph, a graph data structure that represents contextual information of a building, equipment of the building, users, events occurring within the building, etc. In this regard, certain components, i.e., words or phrases of the user question, can be interpreted with the context of the building knowledge graph. Interpreting the components with the context of the building knowledge graph may result in an identification of the information that the user is seeking and sources (e.g., databases, data nodes of the knowledge graph, etc.). The system can then retrieve the information from the sources and compose a presentation for the user.

In some embodiments, the presentation provided to the user is dynamically determined. For example, the format for presentation, i.e., audio presentation, textual presentation, graphical presentation, etc. can be identified from the user question. For example, some components within the question, such as "plot," "show," "illustrate" may indicate that the user is interested in a graphical representation of the information. Based on the presence of such components, the system can generate a graphical presentation for the information.

In addition to responding to user questions, the system can push information to the user. For example, when new equipment data is received from equipment of a building, the equipment data may trigger a rule. For example, a fault rule may trigger if a data point received from the equipment indicates a fault. In some embodiments, the system can perform machine learning to identify what insights that a particular user may be interested in. Triggering an insight or learning an insight through machine learning algorithms can cause the system to proactively push the insight to the user, i.e., the user may receive the insight without directly requesting the insight from the system. The pushed insights may be based on the contextual information of the building represented in the knowledge graph. For example, if the knowledge graph indicates that a particular user is a building owner and another user is an employee who has an office in the building, that building owner may be interested in insights for the building that save energy for the building. Energy savings insights can be generated by the system and pushed to the building owner. However, for the employee of the building, the energy insights may not be applicable and thus the system may not push the energy insights to the user.

Conversational assistants such as Siri, Cortana, the Google Assistant, and Alexa lack the ability to utilize contextual information of a building when responding to user questions. Advantageously, the ability to utilize contextual information can allow the building system described herein to respond to questions that a conventional conversational assistant would not be able to respond to. For example, the question, "Show me faults for my equipment," could be interpreted against the context of the building to identify what pieces of equipment are owned or under the supervision of the person asking the question. Because a conventional conversational assistant does not have such context, the conversational assistant would not be able to ask the question.

This application is related to U.S. patent application Ser. No. 16/688,819 filed Nov. 19, 2019, U.S. patent application Ser. No. 16/260,078 filed Jan. 28, 2019, U.S. patent application Ser. No. 16/008,885 filed Jun. 14, 2018, U.S. patent application Ser. No. 16/014,936 filed Jun. 21, 2018, U.S. Provisional Patent Application No. 62/929,610 filed Nov. 1, 2019, and U.S. patent application Ser. No. 15/586,104 filed Jun. 3, 2017, the entirety of each of which is incorporated by reference herein.

Referring now to FIG. 1, a UI-less UX system 100 of a building 102 including a dynamic UX service 120 and a knowledgebase 118 is shown, according to an exemplary embodiment. The system 100 is configured to receive user questions from a user device 124 of a user and compose responses for presentation to the user via the user device 124, in some embodiments. The building 102 may be a commercial or residential building, e.g., a house, an apartment complex, a school, an office building, a museum, a gallery, a sky rise, etc. The building 102 can includes spaces 104, assets 106, and people 108.

The spaces 104 may be areas of the building 102, for example, rooms, hallways, conference rooms, floors, parking areas, etc. The assets 106 may be equipment of the spaces 104, e.g., HVAC devices, security devices, fire suppression devices, surveillance devices, etc. Examples of the assets 106 may be devices that can communicate, e.g., via a network, to a data ingestion service 116 of the system 100, i.e., the edge devices 110-114. Furthermore, the building 102 includes, or is associated with, people 108. The people 108 may be building owners, building occupants, building tenants, building workers (e.g., technicians, repair people, building managers, etc.).

The system 100 includes the data ingestion service 116, the knowledgebase 118, and an dynamic UX service 120. Each of the components 116-120 and 126 can be implemented across one or multiple servers and/or local systems. For example, the components 116-120 and 126 can be distributed across multiple physical computing systems and/or devices or located within a common computing infrastructure. For example, the components 116-120 and 126 can be implemented in MICROSOFT AZURE, AMAZON WEBSERVICES, and/or any other cloud computing system. Each of the components 116-120 can be implemented on processing circuits and/or memory devices. For example, data ingestion service 116 is shown to include one or multiple processors 134 and one or multiple memory devices 136. Similarly, the dynamic UX service 120 can include one or multiple processors 138 and/or one or multiple memory devices 140.

The processors can be a general purpose processor, an application specific integrated circuit (ASIC), one or more field programmable gate arrays (FPGAs), a group of processing components, or other suitable electronic processing components. The processor can be communicatively coupled to the memory. The memory can include one or more devices (e.g., memory units, memory devices, storage devices, etc.) for storing data and/or computer code for completing and/or facilitating the various processes described in the present disclosure. The memory can include random access memory (RAM), read-only memory (ROM), hard drive storage, temporary storage, non-volatile memory, flash memory, optical memory, or any other suitable memory for storing software objects and/or computer instructions. The memory can include database components, object code components, script components, or any other type of information structure for supporting the various activities and information structures described in the present disclosure. The memory can be communicably connected to the processor via the processing circuit and can include computer code for executing (e.g., by the processor) one or more processes described herein.

The knowledgebase 118 can be a database system storing information of the building 102. The knowledgebase 118 can be a graph database (GDB). The knowledgebase 118 can be in a Resource Desorption Framework (RDF) format. Furthermore, the knowledgebase 118 can be based on the BRICK schema. Furthermore, the knowledgebase 118 can be a relational database, an object database, a distributed database, a NoSQL database, and/or any other type of database.

The knowledgebase 118 can be a digital twin of the building 102 or of specific entities of the building 102. The digital twin can provide a virtual representation of information of the building 102, e.g., a living and adapting digital knowledgebase of the state of the building 102. The digital twin can provide a virtual representation of equipment, spaces, people, and/or events associated with, or located in, the building 102.

The knowledgebase 118 can store timeseries data 142 that may be collected from the edge devices 110-114 (e.g., temperature data, control decisions, occupancy data, security data, etc.). The timeseries data 142 may be time correlated, i.e., a series of data samples each linked to a time stamp indicating when the data sample was recorded by the edge devices 110-114. The knowledgebase 118 can further store building context 144, i.e., information describing the building 102, i.e., the spaces 104, the assets 106, and the relationships between the spaces 104 and/or the assets 106. Furthermore, the building context 144 can include user context 146, i.e., information describing the people 108 of the building 102 and/or the relationships between the spaces 104, the assets 106, and/or the people 108.

The data ingestion service 116 is shown to collect data from the edge devices 110-114 of the building 102 and ingest the information into the knowledgebase 118. For example, the timeseries data 142 could be collected by the data ingestion service 116 from the edge device 110 and stored in the knowledgebase 118. The data ingestion service 116 may store logic for identifying where in the knowledgebase 118 to store data, i.e., what devices, spaces, or people to relate the collected data to in the knowledgebase 118. In addition to collecting data from the edge devices 110-114 and ingesting the collected data of the edge devices 110-114, the data ingestion service 116 can ingest data from other systems, e.g., from human resource systems, social media systems, tenant billing systems, room scheduling systems, and/or any other system that stores contextual information of the building 102 and/or entities associated with the building 102.

Based on the information ingested and stored by the knowledgebase 118, the dynamic UX service 120 can generate one or multiple presentations 122 for providing to the user device 124. The presentations 122 can be textual based responses, visual responses, and/or audio based responses to questions that a user of the user device 124 provides to the dynamic UX service 120 via the user device 124. In this regard, the dynamic UX service 120 can be configured to decompose a question provided by the user device 124 into a presentation context and a requested information context where the presentation context describes the presentation format (e.g., graphic based, text based, audio based) that the user desires and the requested information context (e.g., what faults, to-dos, or other information that the user is interested in).

In some embodiments, the dynamic UX service 120 performs analytics on data retrieved from the knowledgebase 118 to surface insights to the user device 124. In some embodiments, the dynamic UX service 120 performs the analytics by communicating with analytics engine service 126. The analytics engine service 126 can, upon request by the dynamic UX service 120, instantiate one of multiple analytics algorithms, i.e., the analytics engine 128, the analytics engine 130, and/or the analytics engine 132 to perform the analytics for the dynamic UX service 120 and return a result of the analytics algorithm. The result may be pushed by the analytics engine service 126 back to the dynamic UX service 120 for presentation to the user.

In some embodiments, the analytics performed by the analytics engine service 126 could be equipment vibration analysis where faults or improvements for equipment can be derived from vibration data stored in the knowledgebase 118. Examples of the vibration analysis that the analytics engine service 126 could perform can be found in U.S. patent application Ser. No. 15/993,331 filed May 30, 2018 which is incorporated by reference herein in its entirety.

In some embodiments, the analytics performed by the analytics engine service 126 are performed by cognitive agents (i.e., each of the engines 128-132 are agents), machine learning modules deployed to perform analytics. Examples of agents can be found in U.S. patent application Ser. No. 16/036,685 filed Jul. 16, 2018, U.S. patent application Ser. No. 16/533,499 filed Aug. 6, 2019, and U.S. patent application Ser. No. 16/533,493 filed Aug. 6, 2019, the entireties of which are incorporated by reference herein.

In some embodiments, the analytics performed by the analytics engine service 126 include building load forecasting and/or building load prediction model training for the building 102. In this regard, the load forecasting and model training described in U.S. patent application Ser. No. 16/549,037 filed Aug. 23, 2019, U.S. patent application Ser. No. 16/549,744 filed Aug. 23, 2019, U.S. patent application Ser. No. 16/549,656 filed Aug. 23, 2019, U.S. patent application Ser. No. 16/115,120 filed Aug. 28, 2018, and U.S. patent application Ser. No. 16/115,282 filed Aug. 28, 2018 can be performed by the analytics engine service 126, the entirety of each of which is incorporated by reference herein.

In some embodiments, the analytics performed by the analytics engine service 126 include equipment fault prediction. For example, the equipment fault prediction may be chiller fault prediction, e.g., the chiller fault prediction and model management and training as described with reference to U.S. patent application Ser. No. 16/198,456 filed Nov. 21, 2018, U.S. patent application Ser. No. 16/198,416 filed Nov. 21, 2018, and U.S. patent application Ser. No. 16/198,377 filed Nov. 21, 2018, the entireties of which are incorporated by reference herein.

In some embodiments, the analytics performed by the analytics engine service 126 includes processing risk information, e.g., threat data, and generating risk scores for building assets, e.g., the spaces 104, the assets 106, and/or the people 108. Examples of the risk analytics that the analytics engine service 126 can be configured to perform are found in U.S. patent application Ser. No. 16/143,037 filed Sep. 26, 2018, U.S. patent application Ser. No. 16/143,221 filed Sep. 26, 2018, U.S. patent application Ser. No. 16/143,276 filed Sep. 26, 2018, U.S. patent application Ser. No. 16/143,256 filed Sep. 26, 2018, U.S. patent application Ser. No. 16/143,274 filed Sep. 26, 2018, U.S. patent application Ser. No. 16/143,283 filed Sep. 26, 2018, U.S. patent application Ser. No. 16/143,247 filed Sep. 26, 2018, U.S. patent application Ser. No. 16/143,282 filed Sep. 26, 2018, U.S. patent application Ser. No. 16/255,719 filed Jan. 23, 2019, and U.S. patent application Ser. No. 16/269,274 filed Feb. 6, 2019, the entirety of each of which is incorporated by reference herein.

In some embodiments, the analytics performed by the analytics engine service 126 includes processing security system data to detect whether actions can be taken to reduce false alarms in the building 102. Examples of false alarm reduction based analytics can be found in U.S. patent application Ser. No. 15/947,725 filed Apr. 6, 2018, U.S. patent application Ser. No. 15/947,722 filed Apr. 6, 2018, U.S. patent application Ser. No. 16/172,371 filed Oct. 26, 2018, U.S. patent application Ser. No. 16/368,620 filed Mar. 28, 2019, and U.S. patent application Ser. No. 16/417,359 filed May 20, 2019, the entirety of each of which is incorporated by reference herein.

In some embodiments, the analytics performed by the analytics engine service 126 include assurance services to detect faults and/or determine actionable insights for improving the performance of building equipment. Examples of assurance services processing that the analytics engine service 126 can be configured to perform can be found in U.S. patent application Ser. No. 16/142,472 filed Sep. 26, 2018 and U.S. patent application Ser. No. 16/583,966 filed Sep. 26, 2019, the entireties of which are incorporated by reference herein.

Furthermore, in some embodiments, the analytics performed by the analytics engine service 126 include timeseries processing analytics. Examples of timeseries processing that the analytics engine service 126 can be configured to perform can be found in U.S. patent application Ser. No. 15/644,519 filed Jul. 7, 2017, U.S. patent application Ser. No. 15/644,581 filed Jul. 7, 2017, and U.S. patent application Ser. No. 15/644,560 filed Jul. 7, 2017, the entirety of each of which are incorporated by reference herein.

In some embodiments, the analytics engine service 126 can perform model predictive maintenance (MPM) where equipment is controlled, serviced, or replaced in such a manner to improve the performance of the equipment and meet financial incentives. Examples of MPM that the analytics engine service 126 can be configured to perform can be found in U.S. patent application Ser. No. 15/895,836 filed Feb. 13, 2018, U.S. patent application Ser. No. 16/232,309 filed Dec. 26, 2018, U.S. patent application Ser. No. 16/418,686 filed May 21, 2019, U.S. patent application Ser. No. 16/438,961 filed Jun. 12, 2019, U.S. patent application Ser. No. 16/449,198 filed Jun. 21, 2019, U.S. patent application Ser. No. 16/457,314 filed Jun. 28, 2019, and U.S. patent application Ser. No. 16/518,548 filed Jul. 22, 2019, the entirety of each of which is incorporated by reference herein.

Furthermore, the user, via the user device 124 can provide feedback to the system 100. For example, the feedback may be a follow-on question to a first question asked by the user, e.g., asking for more detailed information, indicating that the response provided by the dynamic UX service 120 is inaccurate, etc. Furthermore, the feedback can be indicative of actions performed by the user. For example, if the presentation 122 prompts the user to replace a component of the edge device 114, the feedback to the dynamic UX service 120 may be an indication that the user has performed the action. In some embodiments, rather than directly providing the feedback, an action such as replacing a component can be detected by the edge device 114 and provided by the edge device 114 to the dynamic UX service 120.

In some embodiments, rather than, or in addition to responding to a user question, the dynamic UX service 120 can be configured to derive insights and push the insights to the user device 124. For example, the dynamic UX service 120 may store a set of rules that indicate a fault or action that a user should take to repair equipment or improve the performance of the equipment. When new data is ingested into the knowledgebase 118, the dynamic UX service 120 can be configured to run the set of rules against the new data to see if any of the rules are triggered by the new data. A triggered rule may indicate a fault, action, or other insight for a user to review. Based on the insight identified in the triggered rule, the dynamic UX service 120 can be configured to generate a presentation indicating the triggered rule to the user device 124. In some embodiments, the presentation is based on both the triggered rule and the new data, for example, an indication of the insight in addition to the new data that triggered the rule. In some embodiments, the presentation is based on the identity of the user that the presentation is destined for. For example, if a user generally asks for charts or visualizations, the dynamic UX service 120 can generate a visualization for the triggered rule. However, if the user frequently requests spoken word presentation, the dynamic UX service 120 may compose an audio presentation of the triggered rule.

In some embodiments, the dynamic UX service 120 performs a machine learning algorithm to derive insights for presentation to the user. The machine learning algorithm may identify, based on historical questions of a user, what types of information a user might be interested in. For example, if a user frequently provides questions to the dynamic UX service 120 for energy usage information, the machine learning algorithm may identify that energy savings is important to the user. The machine learning algorithm may run equipment simulations and/or perform other analysis that result in improved equipment settings or schedules that save energy. Such an insight can be composed into a presentation by the dynamic UX service 120 and pushed to the user device 124.

Rather than requiring predefined analyzers, the system 100 can utilize the dynamic UX service 120 which can dynamically derive information for presentation to the user via the user device. Furthermore, rather than requiring a predefined user interface service that provides a standardized information presentation, the dynamic UX service 120 can dynamically identify an appropriate or desired presentation format for information requested by the user and dynamically generate the presentation 122 for presentation to the user based on the derived context indicating the appropriate presentation format.

In some embodiments, the knowledgebase 142 stores a question graph data structure indicating historical questions asked by a user or multiple users. The graph data structure may include nodes representing possible questions that a user may ask and nodes representing various users. Relationships between a particular user node and each of the possible questions may have a weight value indicating how frequently a user asks a particular question. The dynamic UX service 120, in some embodiments, is configured to analyze the question graph data structure to identify a question that a user may not have asked but would be interested in.

For example, if a building manager of a first building has a relationship greater than a predefined amount between a node representing the first building manager and an energy savings question, but a second building manager of a second building, represented by a second building manager node, does not have a relationship greater than the predefined amount between the node representing the second building manager and the energy savings question, the dynamic UX service 120 may identify that the second building manager may be interested in energy savings for the second building. This identification can be generated by the dynamic UX service 120 since the energy savings question is important to the first building manager and the first building manager and the second building manager fulfill similar roles in the first and second buildings. The dynamic UX service 120 may generate energy savings information pertaining to the second building and automatically push the energy savings information to a user device of the second building manager.

Figure 2:
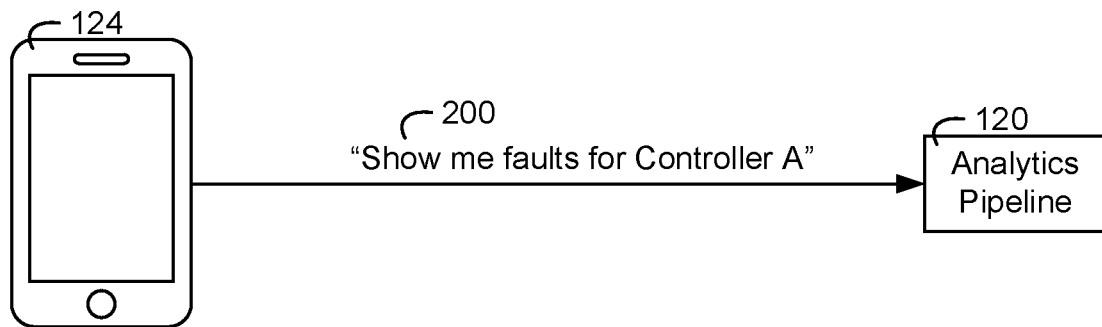
FIG. 2 is a block diagram of a question provided to the dynamic UX service by the user device, the question asking to be shown fault information of a particular controller, according to an exemplary embodiment.

Referring now to FIG. 2, a question 200 is provided by the user device 124 to the dynamic UX service 120, according to an exemplary embodiment. The question 200 is a textual input, i.e., "Show me faults for Controller A." In some embodiments, the user types the question 200 into the user device 124. In some embodiments, the user speaks the question 200 into the user device 124 and the audio is translated into textual data by the user device 124 and/or the dynamic UX service 120. The question 200 specifies that the user wishes to be shown information, that the user is interested in fault information, and that the user is interested in a particular device of the building 102, i.e., a controller labeled "A."

Figure 3:
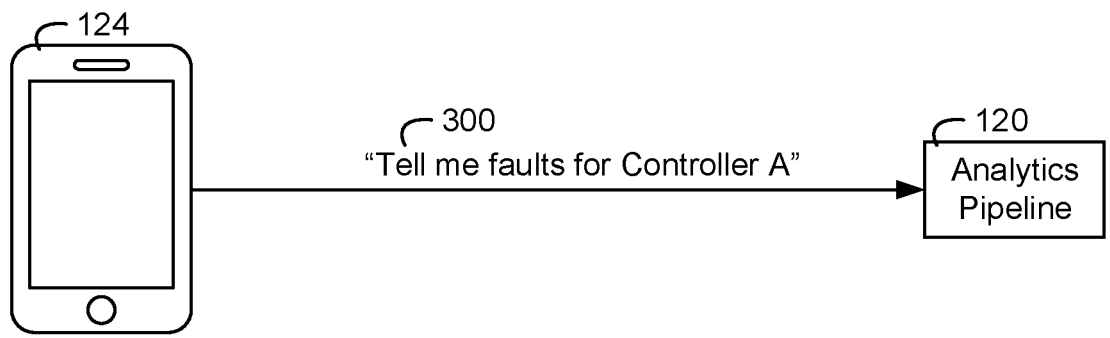
FIG. 3 is a block diagram of a question provided to the dynamic UX service by the user device, the question asking to be told the fault information of the particular controller, according to an exemplary embodiment.

Referring now to FIG. 3, a question 300 is provided by the user device 124 to the dynamic UX service 120, according to an exemplary embodiment. The question 300 is a textual input, i.e., "Tell me faults for Controller A." In some embodiments, the user types the question 300 into the user device 124. In some embodiments, the user speaks the question 300 into the user device 124 and the audio is translated into textual data by the user device 124 and/or the dynamic UX service 120. The question 300 specifies that the user wishes to be told information, that the user is interested in fault information, and that the user is interested in a particular device of the building 102, i.e., a controller labeled "A."

Figure 4:
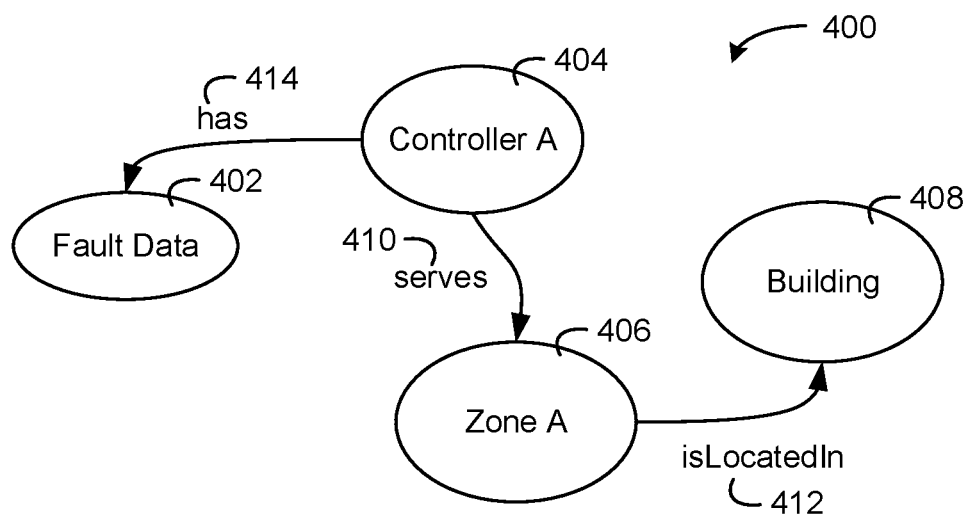
FIG. 4 is a graph data structure indicating building context of the building, where the graph data structure is an example of the knowledgebase, according to an exemplary embodiment.

Referring now to FIG. 4, a graph data structure 400 is shown, according to an exemplary embodiment. The graph data structure 400 can be an example of the knowledgebase 118 or a component of the knowledgebase 118. The graph data structure 400 includes multiple nodes and edges, i.e., nodes 402-408 and edges 410-414. The nodes 402-408 represent entities of the building 102, i.e., data, equipment, areas, and the building 102 itself. The nodes 402-408 include a controller A node 404, a fault data node 402, a zone A node 406, and a building node 408.

The controller A node 404 is associated with the fault data node 402 via the has edge 414, indicating that the controller A has generated or is otherwise associated fault data. The controller A node 404 is associated with the zone A node 406 via the serves edge 410, indicating that the controller A operates to control the zone A. Furthermore, the zone A node 406 is associated with the building node 408 via the isLocatedIn edge 412, indicating that the zone A is a zone of the building.

Figures 5, 6:
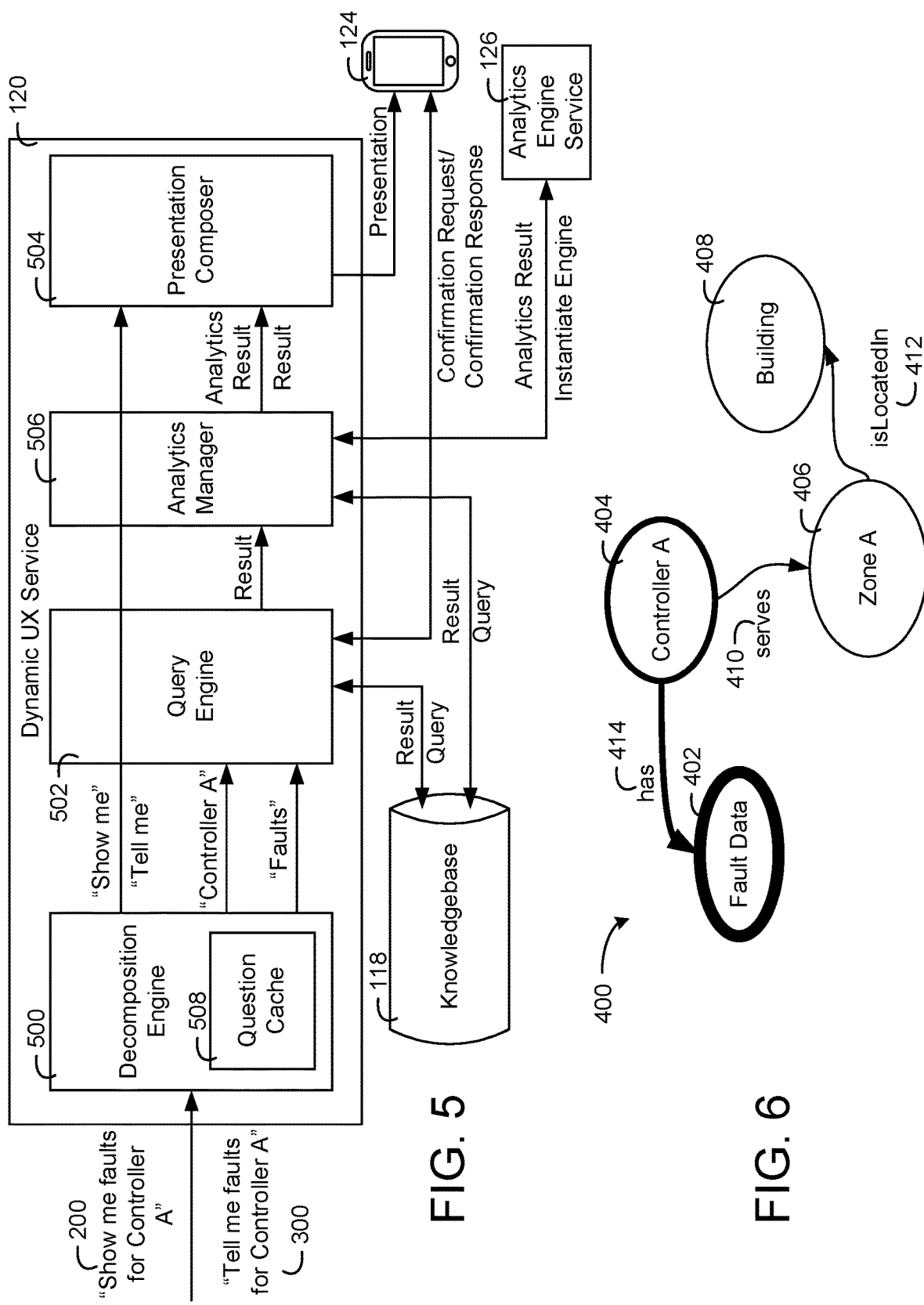
FIG. 5 is a block diagram of the dynamic UX service in greater detail illustrating the dynamic UX service processing the questions of FIGS. 2-3 to compose a presentation for the user device, according to an exemplary embodiment.
FIG. 6 is the graph data structure of FIG. 4 illustrating nodes and edges of the graph data structure queried by the dynamic UX service to answer the questions of FIGS. 2-3, according to an exemplary embodiment.

Referring now to FIG. 5, the dynamic UX service 120 shown in greater detail processing the questions 200 and 300 and for composing a presentation for the user device, according to an exemplary embodiment. The dynamic UX service 120 includes a decomposition engine 500, a query engine 502, and a presentation composer 504. The decomposition engine 500 is configured to decompose the question strings of questions 200 and 300 into multiple components, in some embodiments. The components may be words or phrases. In some embodiments, the components either describe requested information context or presentation context. The components describing the presentation context can be provided by the decomposition engine 500 to the presentation composer 504 while the components describing the requested information context can be provided to the query engine 502.

In some embodiments, the decomposition engine 500 includes a question cache 508. The question cache 508 can be configured to store information pertaining to historical questions of the user of the user device 124. In this regard, if the user asks two questions that are the same or similar, rather than decomposing the question, the decomposition engine 500 can instruct the presentation composer 504 to present the previous presentation instead of creating the same presentation twice and unnecessarily using processing resources. In some embodiments, the question cache 508 may store information pertaining to historical questions of users other than the user of the user device 124. For example, upon receiving a question from the user device 124, the decomposition engine 500 may determine whether the question cache 508 includes the same or a similar question and, if so, utilize part or all of the presentation data from the prior presentation to the same/similar question to generate the presentation for the current question. In some implementations, if the previous question was from a different user, the decomposition engine 500 may determine whether the presentation should be changed based on the identity of the user (e.g., if the prior question requested data specific to the prior user or was customized to the preferences of that user).

The query engine 502 can be configured to query the knowledgebase 118 based on the components received from the decomposition engine 500. In FIG. 5, the components are "Controller A" and "Faults." In some embodiments, the query engine 502 is configured to further query the knowledgebase 118 based on the components "Show me" and "Tell me" to retrieve data appropriate to be presented visually, in the case of the component "Show me," and retrieve data appropriate to be presented in text, i.e., in the case of the component "Tell me." The query engine 502 is configured to query the knowledgebase 118 based on the components and receive a result from the knowledgebase 118. The query engine 502 is configured to provide the result to an analytics manager 506 and/or the presentation composer 504, in some embodiments.

In some embodiments, the query engine 502 surfaces a confirmation request to the user device 124. The confirmation request can request that the user of the user device 124 confirm that the result data pertains to the question (e.g., the question 200 or the question 300) that the user has asked. In some embodiments, the query engine 502 generates a confidence score indicating a probability that the result of querying the knowledgebase 118 has resulted in data that properly responds to the questions 200 and/or 300. In some embodiments, if the confidence score is less than a predefined level, the query engine 502 is configured to send the confirmation request to the use device 124. In some embodiments, the query engine provides the confidence score along with the result of the query to the analytics manager 506 and/or the presentation composer 504. In some embodiments, the presentation composer 504 can generate the presentation to include an indication of the confidence score.

In response to receiving approval from the user device 124, the query engine 502 and proceed with pushing the result to the analytics manager 506. In some embodiments, the user may disapprove of the query result and provide additional contextual information that the query engine 502 can be configured to use to query the knowledgebase 118 a second time to retrieve new result data. The new result data can be pushed to the analytics manager 506.

The analytics manager 506 can be configured to communicate with the analytics engine service 126 based on the result received from the query engine 502 and cause an analytics engine to be instantiated by the analytics engine service 126. The analytics engine service 126 can be configured to perform analytics based on the result provided by the query engine 502 to generate an analytics result which can be returned to the analytics manager 506. The analytics manager 506 can push the analytics result, along with the original result from the query engine 502, to the presentation composer 504 for composing the presentation to send to the user device 124. In some embodiments, the analytics performed by the analytics engine service 126 requires additional data of the knowledgebase 118. In this regard, the analytics manager 506 can be configured to query the knowledgebase 118 for information for use in the analytics performed by the analytics engine service 126 and provide the additional data to the analytics engine service 126 for processing.

Based on the result received from the query engine 502 and the components received from the decomposition engine 500, the presentation composer 504 is configured to generate a presentation to provide to the user device 124. The presentation composer 504 can format the result received from the query engine 502 according to the presentation context received from the decomposition engine 500. For example, when the presentation context is "Show me," the presentation composer 504 can generate one or more graphic representations of the result and provide the graphic presentations to the user device 124. When the presentation context is "Tell me," the presentation composer 504 can generate a textual and/or audio description of the result for providing to the user device 124.

Referring now to FIG. 6, the graph data structure 400 of FIG. 4 illustrating nodes and edges of the graph data structure 400 queried by the query engine 502 to answer the questions 200 and/or 300 is shown, according to an exemplary embodiment. The query engine 502 can generate a query data structure based on the components received from the decomposition engine 500, i.e., the component "Controller A" can be a parameter of the query indicating that the query should find information related to "Controller A." The component "Faults" may indicate the type of information that the query should return, i.e., fault data.

The query of the query engine 502 identifies the node 404 and the edge 412 to identify the fault data node 402. The knowledgebase 118 can return the fault data node 402 as the result. The fault data can be provided by the query engine 502 to the presentation composer 504 for composition into a response by the presentation composer 504.

Figure 9:
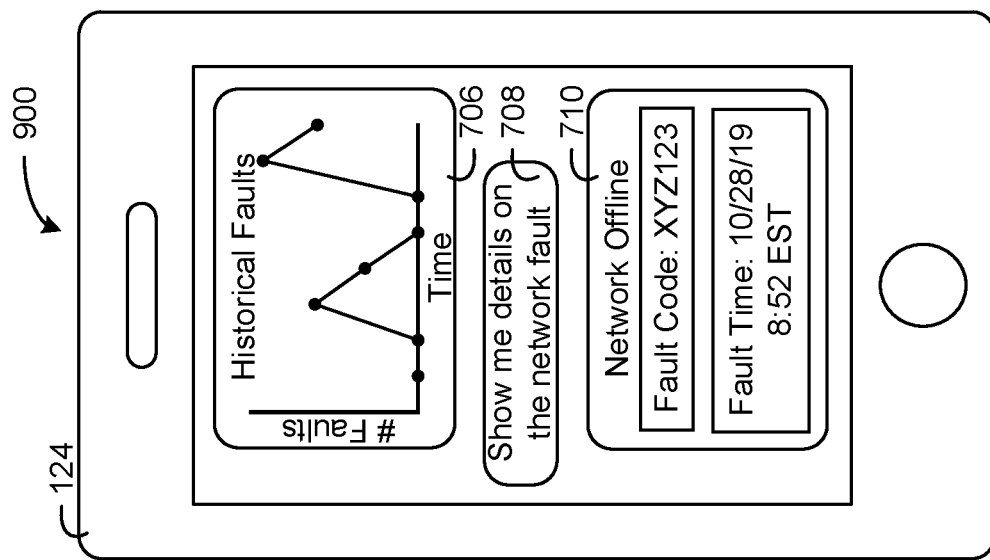
FIGS. 7-9 are examples of a conversation between the user via the user device and the dynamic UX service illustrating the question of FIG. 2 and the response composed for the question of FIG. 2 by the dynamic UX service, according to an exemplary embodiment.
Figure 8:
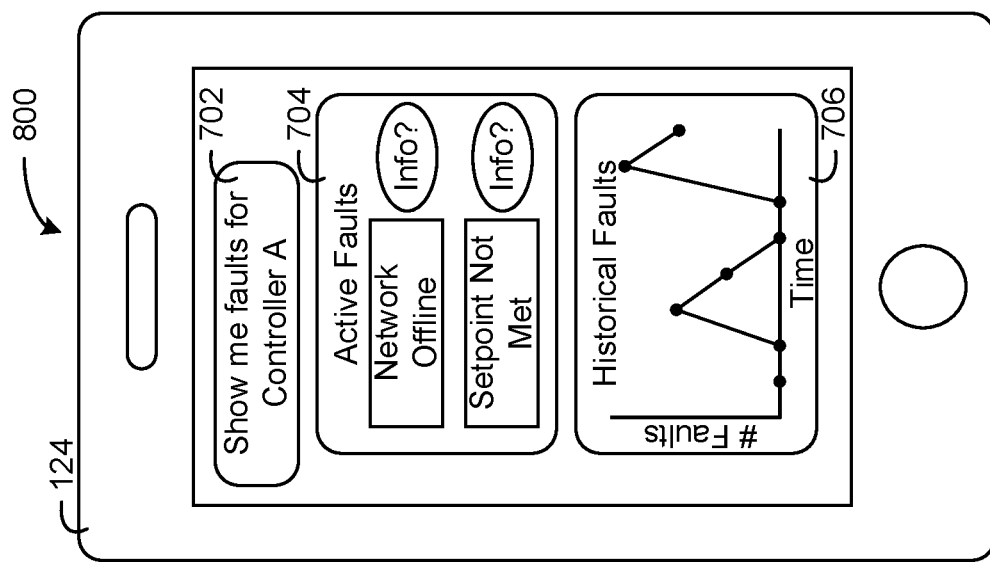
Figure 7:
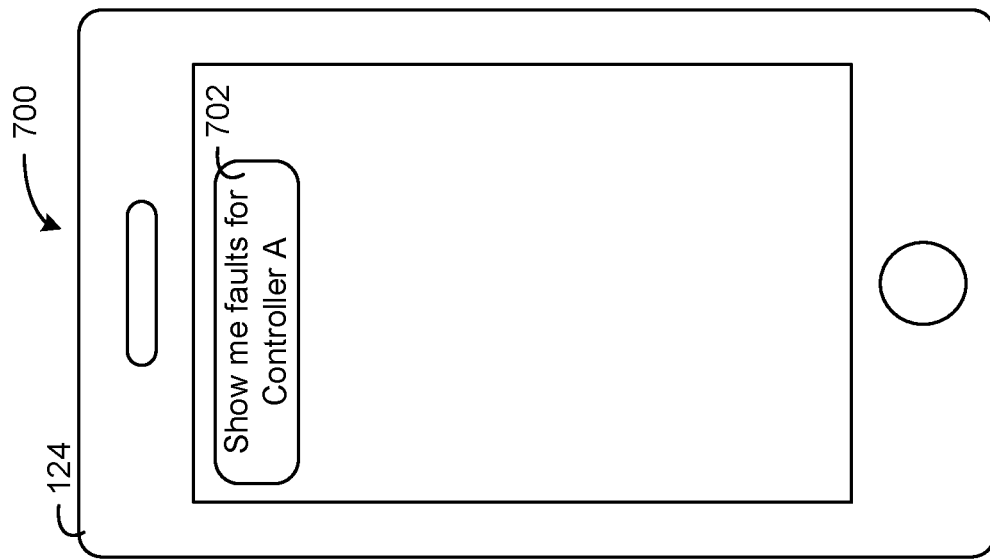

Referring now to FIGS. 7-9, examples 700-900 are shown of a conversation between the user via the user device 124 and the dynamic UX service 120 illustrating the question 200 and the response composed for the question 200 by the presentation composer 504, according to an exemplary embodiment. In FIG. 7, the user provides a prompt 702, i.e., "Show me faults for Controller A," the question 200. In FIG. 8, in response to the question 200, the presentation composer 504 sends a presentation to the user device 124 that the user device 124 displays, i.e., the elements 704 and 706. The presentation composer 504 formats the response to the questions 200 as graphical elements 704 and 706 because the user used the phrase "Show me" in the question 200. In FIG. 9, the user provides a follow-on question to the dynamic UX service 120, "Show me details on the network fault," element 708. The element 708 requests additional information on the network fault shown in element 704. The dynamic UX service 120 generates the element 710 which provides additional details on the identified fault of the element 708. Again, the information is presented as a graphical output since the user uses the phrase "Show me" in the element 708.

Referring now to FIGS. 10-12, examples 1000-1200 are shown of a conversation between the user via the user device 124 and the dynamic UX service 120 illustrating the question 300 and the response composed for the question 300 by the presentation composer 504, according to an exemplary embodiment. In FIG. 10, the user provides a prompt 1002, i.e., "Tell me faults for Controller A" the question 300. In FIG. 11, in response to the question 300, the presentation composer 504 sends a presentation to the user device 124 that the user device 124 displays, i.e., the element 1004. The presentation composer 504 formats the response to the questions 200 as a textual description of faults because the user used the phrase "Tell me" in the question 300. In FIG. 11, the user provides a follow-on question to the dynamic UX service 120, "Tell me more about the network offline fault," element 1006. The element 1006 requests additional information on the network fault described in element 1004. The dynamic UX service 120 generates the element 1008 which provides additional textual details on the identified fault of the element 1006. Again, the information is presented as a textual description since the user uses the phrase "Tell me" in the element 1006.

Figure 13:
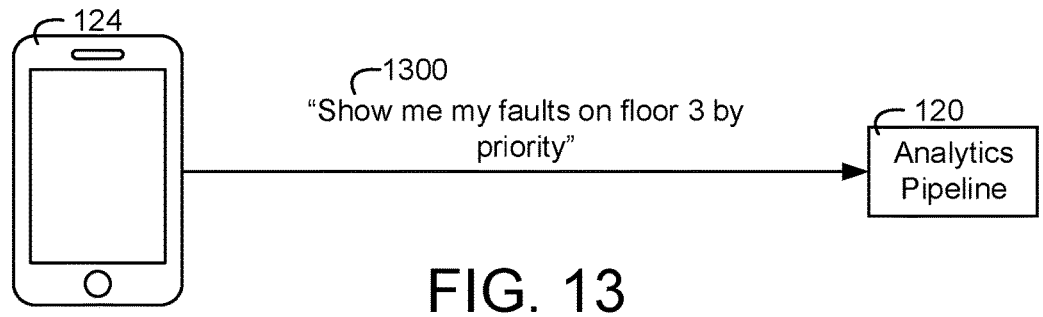
FIG. 13 is a block diagram of a question provided to the dynamic UX service by the user device, the question asking to be shown fault information associated with the user, according to an exemplary embodiment.

Referring now to FIG. 13, a question 1300 is provided by the user device 124 to the dynamic UX service 120, according to an exemplary embodiment. The question 1300 is a textual input, i.e., "Show me my faults on floor 3 by priority." In some embodiments, the user types the question 1300 into the user device 124. In some embodiments, the user speaks the question 1300 into the user device 124 and the audio is translated into textual data by the user device 124 and/or the dynamic UX service 120. The question 1300 specifies that the user wishes to be shown information, that the user is interested in fault information that is associated in some to the user, and that the user is interested in fault information of a particular floor of a building, floor 3, and that the user wishes for the faults to be sorted according to priority.

Figure 14:
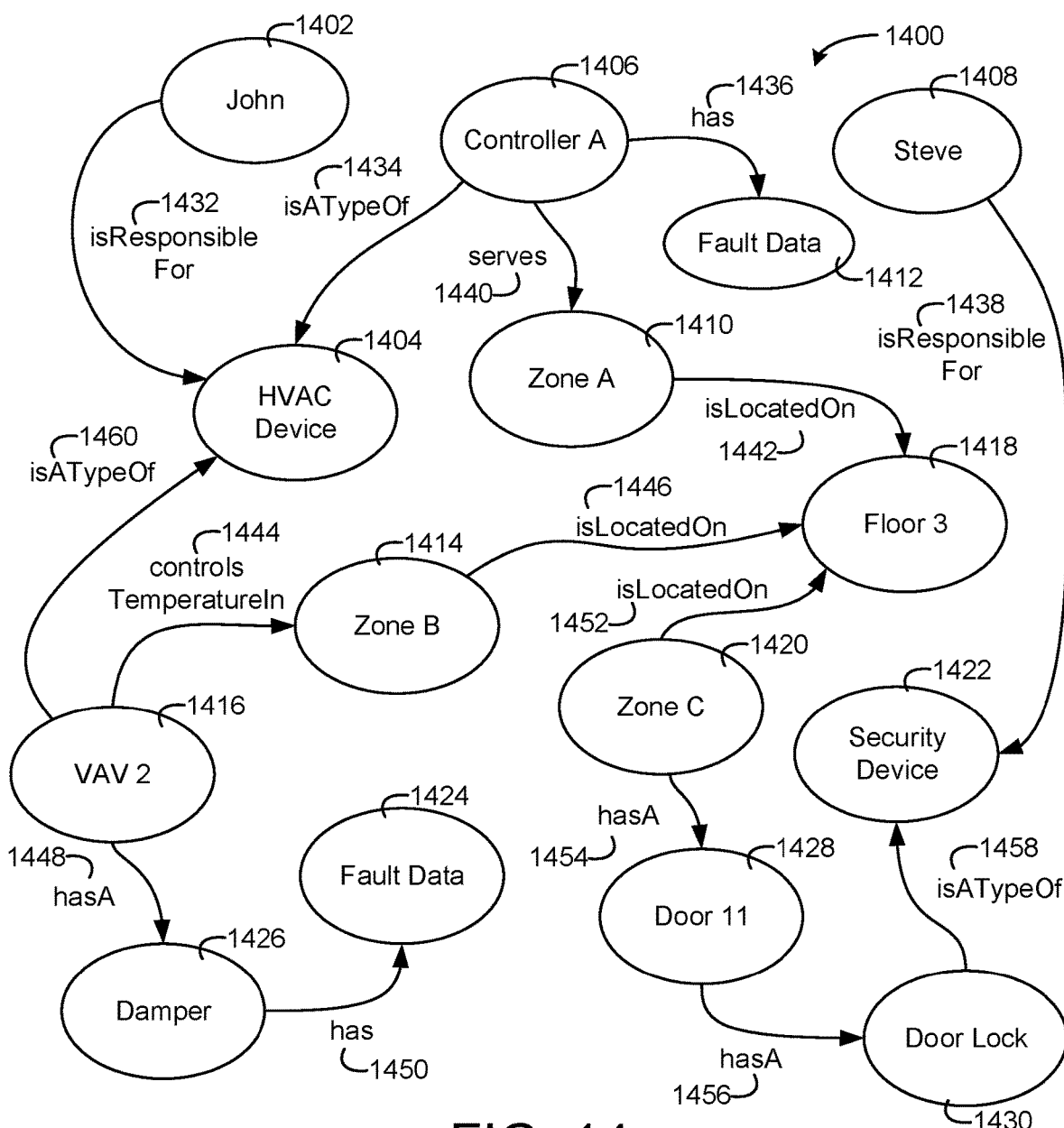
FIG. 14 is a graph data structure indicating building context of the building, where the graph data structure is an example of the knowledgebase, according to an exemplary embodiment.

Referring now to FIG. 14, a graph data structure 1400 is shown, according to an exemplary embodiment. The graph data structure 1400 can be an example of the knowledgebase 118 or a component of the knowledgebase 118. The graph data structure 1400 includes multiple nodes and edges, i.e., nodes 1402-1430 and edges 1432-1456. The nodes 1402-1430 represent entities of the building 102, i.e., data, equipment, areas, and people associated with the building 102.

The graph data structure 1400 includes a John node 1402 representing a user "John." The John node 1402 has a relationship to the HVAC device node 1404, i.e., John is responsible for the HVAC devices indicated by the isResponsibleFor edge 1432. The controller A node 1406 has relationships to the HVAC device node 1404, the zone A node 1410, and the fault data node 1412. The controller A 1406 is a type of HVAC device, indicated by the edge isATypeOf 1434 between the node 1406 and the node 1404. Furthermore, the controller A controls conditions of the zone A, indicated by the serves edge 1440 between the node 1406 and the node 1410. Furthermore, the graph data structure 1400 stores fault data for the controller A, indicated by the node 1412. The fault data is associated with the controller A via the edge 1436. The zone A is located on a floor 3 of the building 102, indicated by the relationship isLocatedOn 1442 between the zone A node 1410 and the floor 3 node 1418.

The VAV 2 node 1416 represents a particular VAV of the building 102. The VAV 2 operates temperature for a particular zone of the floor 3, zone B represented by zone B node 1414. The relationship between the VAV 2 and the zone B is indicated by the controlsTemperatureIn edge 1444 between the node 1416 and the node 1414. The VAV 2 has a damper component, represented by the damper node 1426. The damper is linked to the VAV 2 by the edge hasA 1448 between the node 1416 and the node 1426. Furthermore, because the VAV 2 is a type of HVAC device, the isATypeOf edge 1460 is included between the node 1416 and the node 1404. The damper of the VAV 2 may have fault data associated with it, represented by the fault data node 1424 and the edge between the node 1426 and the node 1424, the has edge 1450. Furthermore, the zone B is a zone of the floor 3, to illustrate this relationship, the graph data structure 1400 includes the isLocatedOn edge 1446 between the node 1414 and the node 1418.

The graph data structure 1400 includes a zone C node 1420 representing another zone of the building 102. The zone C is located on the floor 3. To illustrate the location of the zone C, the graph data structure 1400 includes edge 1452 between the node 1420 and the node 1418. Furthermore, the zone C may have a door, i.e., door 11 represented by the door 11 node 1428. To indicated that the door 11 is a door of the zone C, the graph data structure 1400 includes the hasA edge 1454 between the node 1420 and the node 1428. The door 11 may be a locking door and may include a door lock. The door lock is represented by the door lock node 1420. The door lock is associated with the door 11 by the hasA edge 1456 between the node 1428 and the node 1430.

Because the door lock is a type of security device, the door lock can be linked to the security device node 1422 via the isATypeOf edge 1458. Furthermore, a particular user may be responsible for the security devices of the building 102. The user may be indicated by the Steve node 1408. The responsibility of Steve may be indicated by the isResponsibleFor edge 1438 between the node 1408 and the node 1422.

Figure 15:
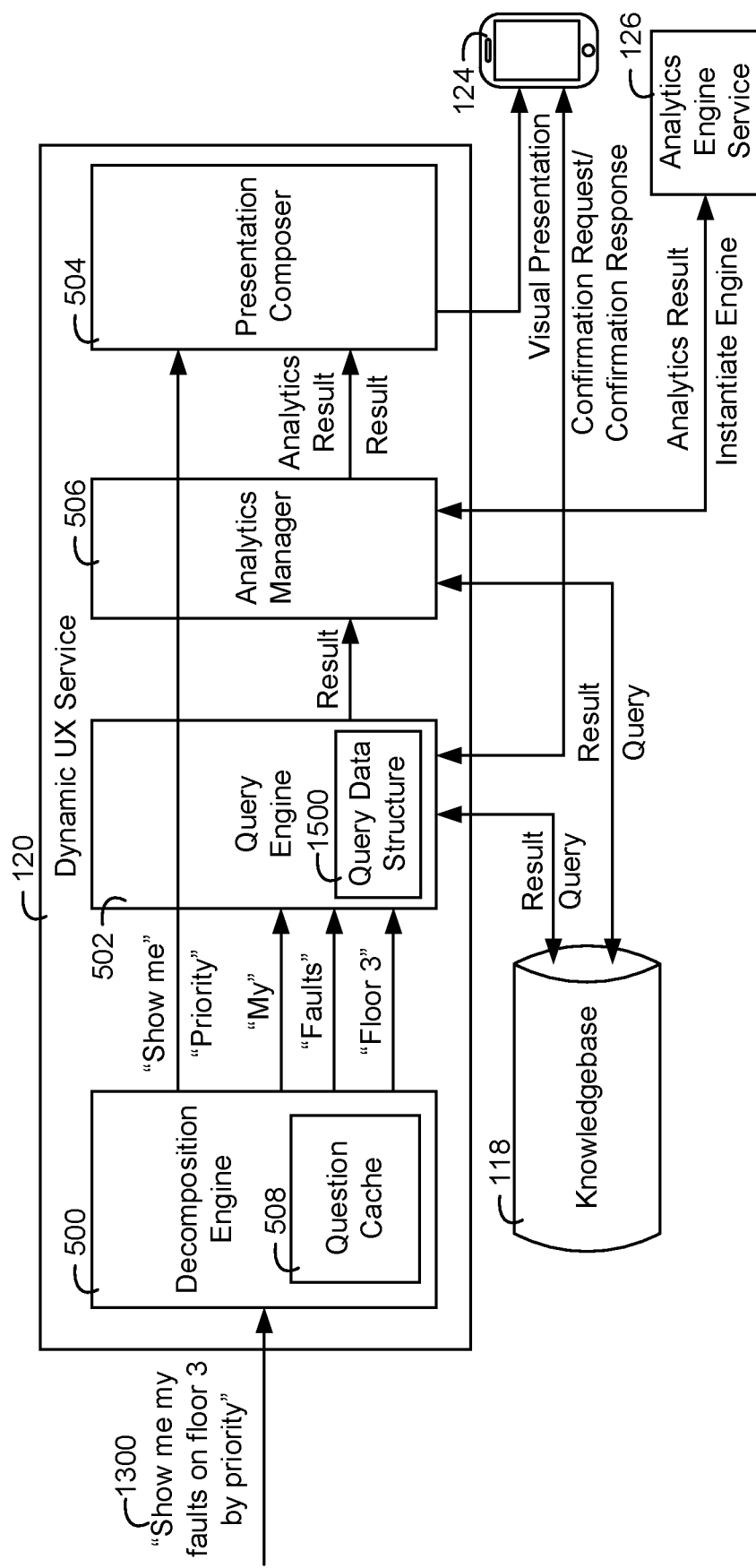
FIG. 15 is a block diagram of the dynamic UX service in greater detail illustrating the dynamic UX service processing the question of FIG. 14 to generate a query data structure for querying the graph data structure of FIG. 14 and composing a presentation for the user device, according to an exemplary embodiment.

Referring now to FIG. 15, the dynamic UX service 120 is shown in greater detail processing the question 1300 and composing a visual presentation for the user device, according to an exemplary embodiment. The decomposition engine 500 is configured to decompose the question strings of questions 1300 into multiple components, in some embodiments. The components are "Show me," "Priority," "My," "Faults," and "Floor 3." The components describing the presentation context, i.e., "Show me" and "Priority," are provided by the decomposition engine 500 to the presentation composer 504 while the components describing the requested information context, i.e., "My," "Faults," and "Floor 3," are provided to the query engine 502.

The query engine 502 includes a query data structure 1500 used by the query engine 502 to query the knowledgebase 118 for a result to provide the presentation composer 504. The query data structure 1500 can be generated by the query engine 502 based on the requested information context and context retrieved from the knowledgebase 118 by the query engine 502. For example, the query engine 502 may need to understand what nodes of a graph data structure correspond to what components received from the decomposition engine 500. For example, "My" may refer to a particular user, e.g., John, which the query engine 502 analyzes the knowledgebase 118 to determine.

Based on the result received from the query engine 502 and the components received from the decomposition engine 500, the presentation composer 504 is configured to generate a visual presentation to provide to the user device 124 in response to the question 1300. The presentation composer 504 can format the result received from the query engine 502 according to the presentation context received from the decomposition engine 500. For example, the presentation context is "Show me," the presentation composer 504 can generate one or more graphic representations of the result and provide the graphic presentations to the user device 124. Furthermore, the presentation context includes a "Priority" component. The presentation composer 504 can be configured to sort the result data received from the query engine 502 to order information in the visual presentation according to priority level, i.e., the presentation composer 504 can either retrieve a priority level for each result and/or generate a priority level for each result and sort the results in descending order of priority.

In some embodiments, the presentation composer 504 and/or the analytics manager 506 is configured to generate a monetization metric for each of the faults. For example, the monetization metric may indicate an expense loss caused by the fault. In this regard, the presentation composer 504 can rank the faults in order of descending expense loss such that the presentation generated by the presentation composer 504 highlights the faults that cause the most monetary loss, i.e., show the faults that cause the greatest monetary loss at the top of a list or other display. In some embodiments, a user may provide a question to the dynamic UX service 120 asking for finance information of particular faults. In response to the request, the analytics manager 506 and/or the presentation composer 504 can generate the monetization metric and present the monetization metric to the user via the user device 124.

In some embodiments, the presentation can be sorted with a scoring algorithm. The scoring algorithm can be executed by the presentation composer and/or the analytics manager 506. For example, the scoring algorithm can take into account a criticality of an asset affected by a fault, i.e., how important the asset is to the building, a location of a space where the asset is located (e.g., on an engineering floor versus a customer floor), or the users that the asset affect (e.g., an assistant versus a company vice president). The scoring algorithm can be executed by the presentation composer and/or the analytics manager to generate a score for each fault and sort the faults by the generated scores.

Figures 16, 17:
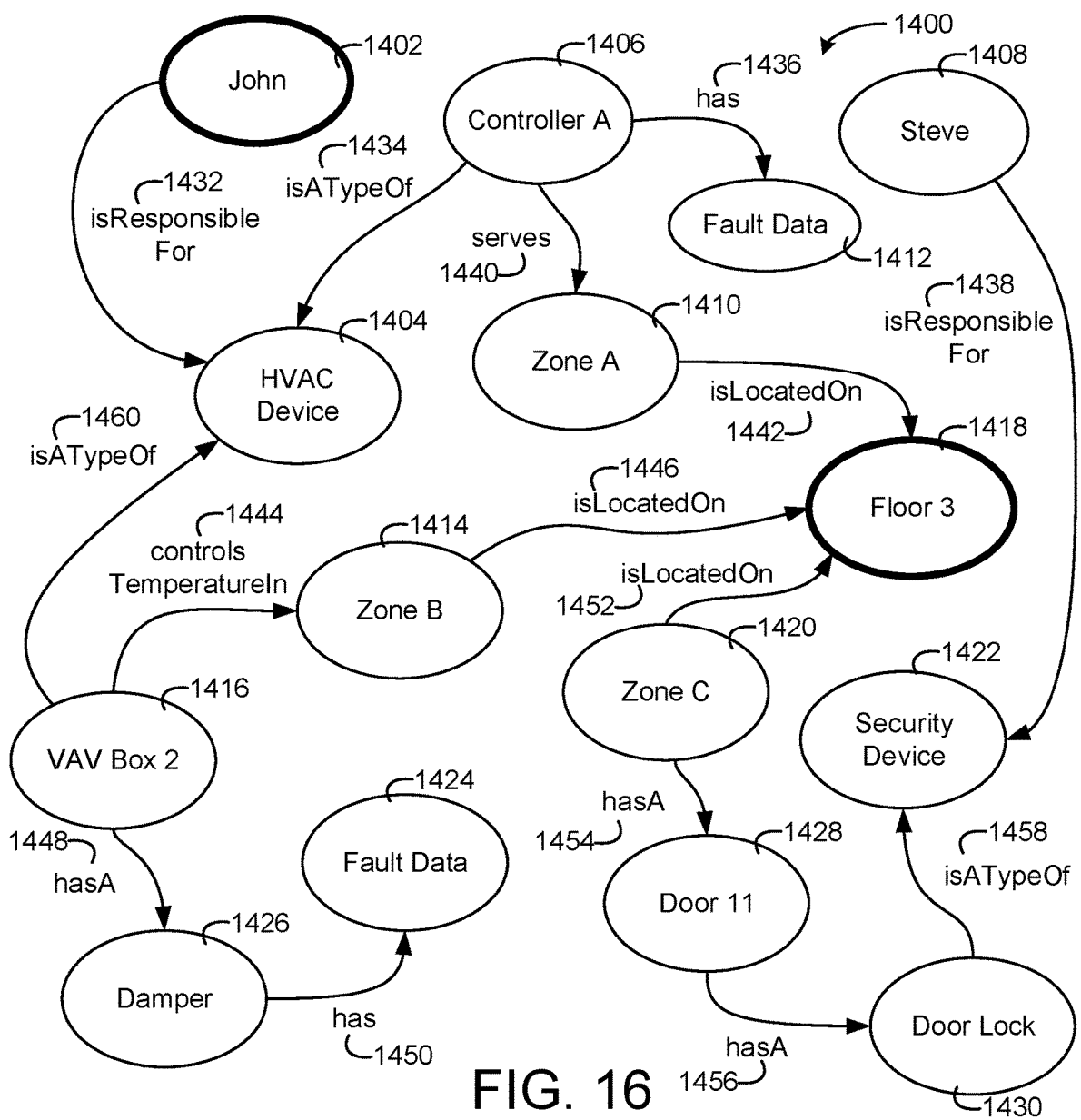
FIG. 16 is the graph data structure of FIG. 14 illustrating the graph data structure being queried to generate the query data structure of FIG. 15, according to an exemplary embodiment.
FIG. 17 is the query data structure of FIG. 15 generated based on querying the graph data structure as shown in FIG. 16, according to an exemplary embodiment.

Referring now to FIGS. 16-17, the graph data structure 1400 of FIG. 14 illustrating nodes and edges of the graph data structure 1400 queried by the query engine 502 to build the query data structure 1500 is shown, according to an exemplary embodiment. The query engine 502 can generate the query data structure based on the components received from the decomposition engine 500, i.e., the components "My," "Floor 3," and "Faults" can be used by the query engine 502 to determine parameters 1700-1704 of the query data structure 1500 indicating that the query should find information related to "John" and "Floor 3." The component "Faults" may indicate the type of information that the query should return, i.e., fault data indicated by the parameter 1704.

In some embodiments, the query engine 502 needs to search and/or query the graph data structure 1400 to determine the parameters 1700 and 1702. For example, the parameter 1700 can be identified by finding which node of the graph data structure 1400 is associated with "My" i.e., the user submitting the question 1300, John, indicated by the node 1402. The component floor 3 can be used to search the graph data structure 1400 to determine whether one of the nodes corresponds to a third floor of the building, i.e., node 1418.

In some embodiments, the query data structure 1500 includes an assumed time indication. For example, the query data structure 1500 may include an indication that the faults queried by the query data structure 1500 are active faults or faults that have not yet been resolved or addressed. In some embodiments, the query data structure 1500 may include a time window parameter, e.g., a predefined window of time to query the faults, i.e., faults only occurring within the predefined window. In some embodiments, the query data structure 1500 is generated by the query engine 502 to include the predefined window of time unless the question asked by the user includes an indication of time. For example, a question that includes the phrase, "Show me all historical faults," may cause the query engine 502 to generate the query data structure 1500 to include no time window.

Figure 18:
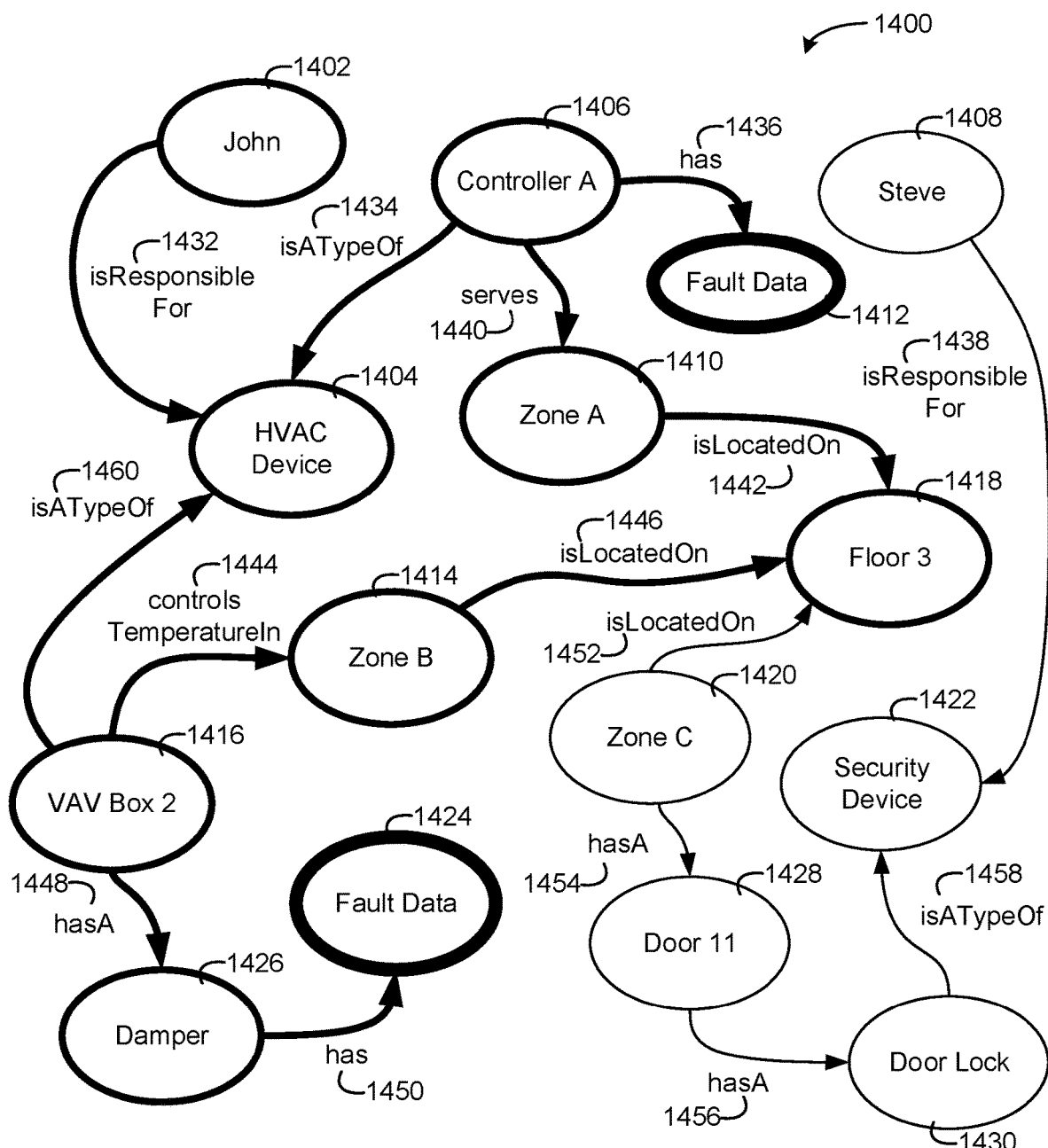
FIG. 18 is the graph data structure of FIG. 14 queried based on the query data structure of FIG. 17 to retrieve fault data, according to an exemplary embodiment.

Referring now to FIG. 18, the graph data structure 1400 queried by the query data structure 1500 is shown, according to an exemplary embodiment. In FIG. 18, the bolded nodes and edges illustrate the nodes and edges traversed in response to the query data structure 1500 while the double bolded nodes, i.e., node 1412 and 1424, represent the result of the queried, i.e., the data returned to the query engine 502. The query data structure 1500 can cause the knowledgebase 118 to return any fault related data linked to both nodes 1402 and 1418, indicated by parameters 1700 and 1702 where the fault type of information to be returned is indicated by the parameter 1704.

In some embodiments, the knowledgebase 118 includes a cache of all node relationships of a graph. For example, the cache may indicate all nodes connected to each node of the graph 1400, i.e., a projection of relationships for every node of the graph. For example, a cache for controller A node 1406 may indicate that the HVAC device node 1404, the zone A node 1410, and the fault data node 1412 are all connected to the controller A node 1406. In some embodiments, the cache may include projection of multiple relationship depths, for example, for a depth of two, the cache of controller A 1406 may indicate that fault data node 1412, zone a node 1410, floor 3 node 1418, HVAC device node 1404, John node 1402, and VAV box 2 node 1416 are all connected to the controller A node 1406. In some embodiments, the parameters of the query data structure 1500 indicating the John node 1402 and the floor 3 node 17021702 may return two cache projections of related nodes. The knowledgebase 118 can compare the two cache projections against each other to find an intersection of fault data nodes, i.e., the fault data node 1412 and the fault data node 1424, to return to the query engine 502. In some embodiments, the cache may be stored as a redis cache.

Figure 21:
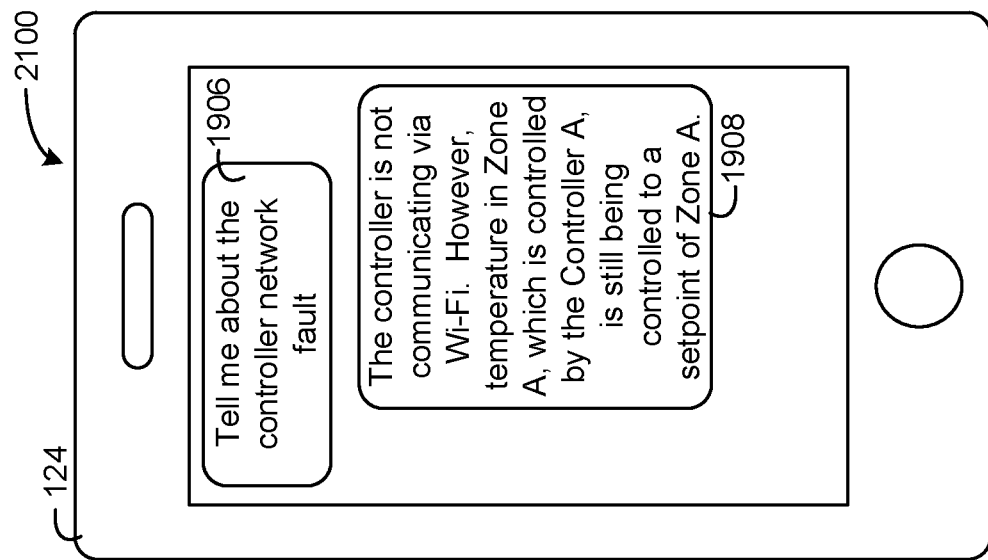
FIGS. 19-21 are examples of a conversation between the user via the user device and the dynamic UX service illustrating the question of FIG. 13 and the response composed for the question of FIG. 13 by the dynamic UX service, according to an exemplary embodiment.
Figure 20:
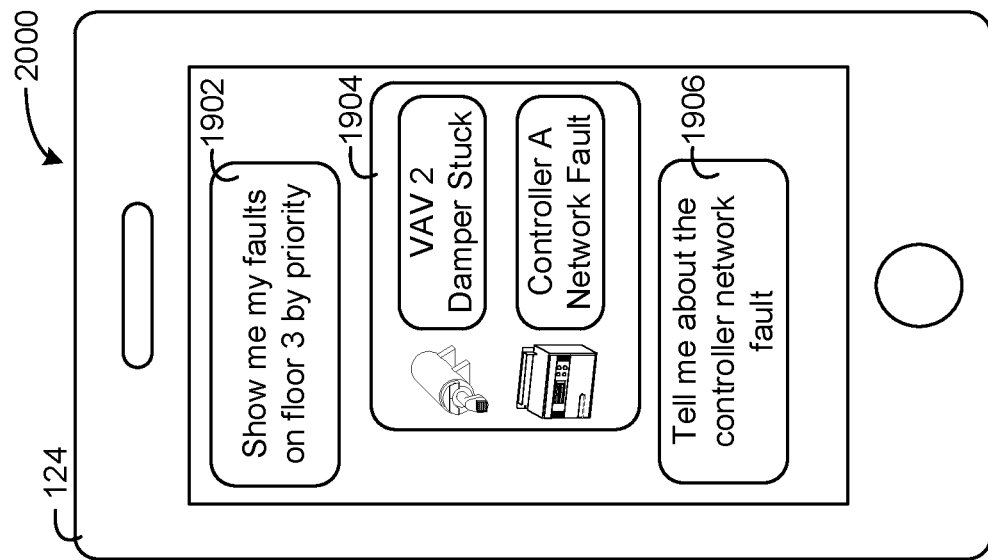
Figure 19:
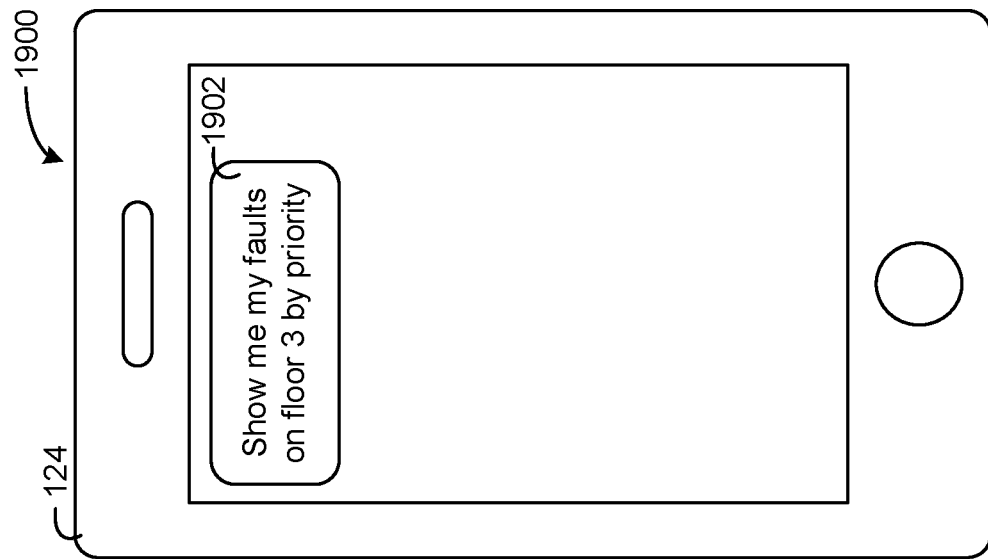

Referring now to FIGS. 19-21, examples 1900-2100 are shown of a conversation between the user via the user device 124 and the dynamic UX service 120 illustrating the question 1300 and the response composed for the question 1300 by the presentation composer 504, according to an exemplary embodiment. In FIG. 19, the user provides a prompt 1902, i.e., "Show me my faults on floor 3 by priority," the question 1300. In FIG. 20, in response to the question 1300, the presentation composer 504 sends a presentation to the user device 124 that the user device 124 displays, i.e., the element 1904. The presentation composer 504 formats the response to the question 1300 as a graphic element of two faults because the user used the phrase "Show me" in the question 1300. The element 1904 includes indications of two faults "VAV Damper Stuck" and "Controller A Network Fault." The "VAV Damper Stuck" element may be included above the "Controller A Network Fault" because the damper being stuck may be a high priority fault than the network fault. The presentation composer 504 may sort the two faults based on priority since the user used the word "priority" in the question 1300.

In FIG. 20, the user provides a follow-on question to the dynamic UX service 120, "Tell me more about the controller network fault," element 1906. The element 1906 requests additional information on the network fault described in element 1904. The dynamic UX service 120 generates the element 1908 which shown in FIG. 21 provides additional textual details on the network fault and information indicating that although the controller is experiencing a network fault, it is still operating the temperature of the zone A properly. The information is presented as a textual description of the controller network fault in the element 1908 since the user uses the phrase "Tell me" in the element 1906.

Figure 22:
FIG. 22 is a block diagram of a question provided to the dynamic UX service by the user device, the question asking to be shown a list of actions associated with the user to be completed before the user leaves the building, according to an exemplary embodiment.

Referring now to FIG. 22, a question 2200 is provided by the user device 124 to the dynamic UX service 120, according to an exemplary embodiment. The question 2200 is a textual input, i.e., "Show my list of things I need to do before I go home." In some embodiments, the user types the question 2200 into the user device 124. In some embodiments, the user speaks the question 2200 into the user device 124 and the audio is translated into textual data by the user device 124 and/or the dynamic UX service 120. The question 2200 specifies that the user wishes to be shown a task list that the user needs to address. The question 2200 further provides a time constraint in the question 2200 indicating that the user only wants to see tasks that need to be completed before the user leaves the building 102 and goes home for the day.

Figure 23:
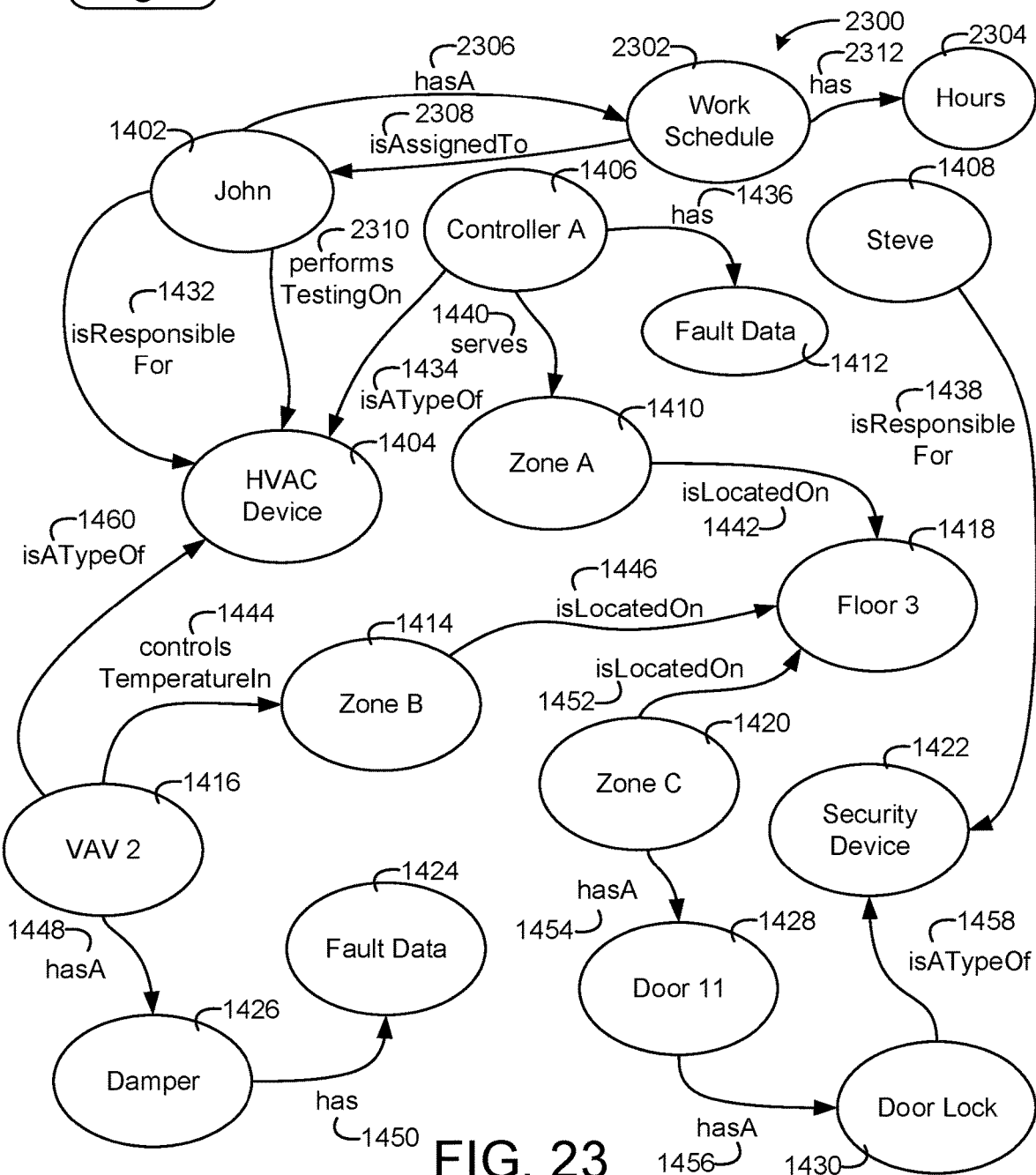
FIG. 23 is a graph data structure indicating building context of the building, where the graph data structure is an example of the knowledgebase, according to an exemplary embodiment.

Referring now to FIG. 23, a graph data structure 2300 is shown, according to an exemplary embodiment. The graph data structure 2300 can be an example of the knowledgebase 118 or a component of the knowledgebase 118. The graph data structure 2300 includes the nodes and edges of the graph data structure 1400 and further nodes 2302 and 2304 an edges 2306, 2308, 2310, and 2312. The work schedule node 2302 provides a work schedule for John. The relationship between the work schedule and John is indicated by the hasA edge 2306 and the isAssignedTo edge 2308. The work schedule may have particular working hours, indicated by the hours node 2304. The has edge 2312 between the node 2302 and the node 2304 indicates that the work schedule has the hours indicated by the node 2304.

The performsTestingOn edge 2310 between the John node 1402 and the HVAC device node 1404 indicates that John is the individual that performs testing on the HVAC devices of the building 102, i.e., the controller A and the VAV 2 1416. This dual edge, i.e., edge 1432 and 2310, indicate two separate duties of John, i.e., he is responsible for the HVAC devices and that he is the individual that performs testing on the HVAC devices.

Figure 24:
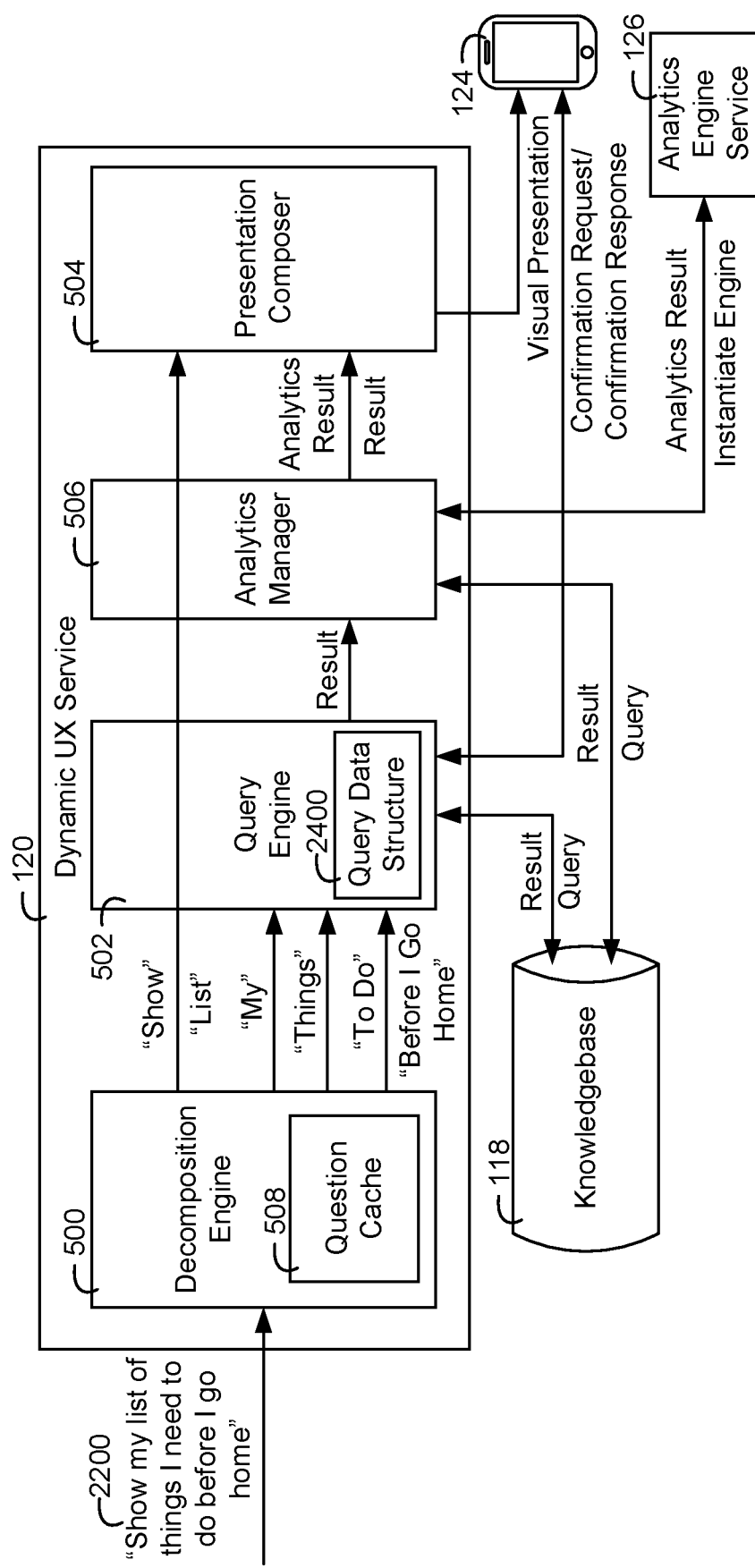
FIG. 24 is a block diagram of the dynamic UX service in greater detail illustrating the dynamic UX service processing the question of FIG. 23 to generate a query data structure for querying the graph data structure of FIG. 23 and composing a presentation for the user device, according to an exemplary embodiment.

Referring now to FIG. 24, the dynamic UX service 120 is shown in greater detail processing the question 2200 and composing a visual presentation for the user device, according to an exemplary embodiment. The decomposition engine 500 is configured to decompose the question string of question 2200 into the components "Show," "List," "My," "Things," "To Do," and "Before I Go Home." The components describing the presentation context, i.e., "Show" and "List," are provided by the decomposition engine 500 to the presentation composer 504 while the components describing the requested information context, i.e., "My," "Things," "To Do," and "Before I Go Home," are provided to the query engine 502.

The query engine 502 includes a query data structure 2400 used by the query engine 502 to query the knowledgebase 118 for a result to provide the presentation composer 504. The query data structure 2400 can be generated based on the requested information context and context retrieved from the knowledgebase 118 by the query engine 502. For example, the query engine 502 may need to understand what nodes of a graph data structure correspond to what components received from the decomposition engine 500. For example, "My" may refer to a particular user, e.g., John, "Things" may pertain to the HVAC devices that John is responsible for, "To Do" may correspond to any action that need to be performed on the HVAC devices, while "Before I Go Home" may provide an indication of a time constraint on the actions that need to be performed.

Based on the result received from the query engine 502 and the components received from the decomposition engine 500, the presentation composer 504 is configured to generate a visual presentation to provide to the user device 124 in response to the question 2200. The presentation composer 504 can format the result received from the query engine 502 according to the presentation context received from the decomposition engine 500. For example, the presentation context is "Show" and "List." Accordingly, the presentation composer 504 can generate a graphic list of actions that need to be performed before the user goes home for the day.

Figure 25:
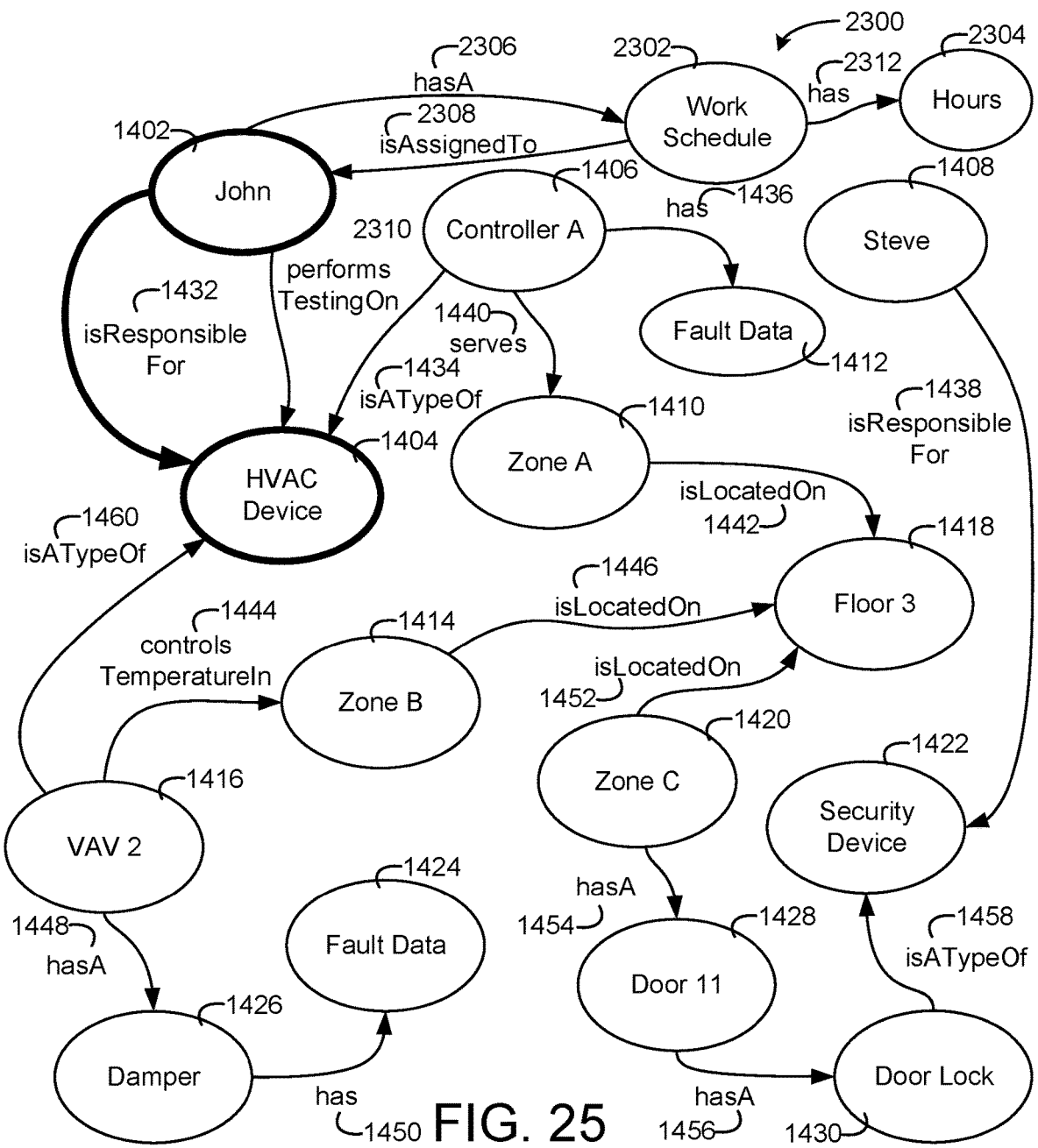
FIG. 25 is the graph data structure of FIG. 24 illustrating the graph data structure being queried to generate the query data structure of FIG. 24, according to an exemplary embodiment.
Figure 26:
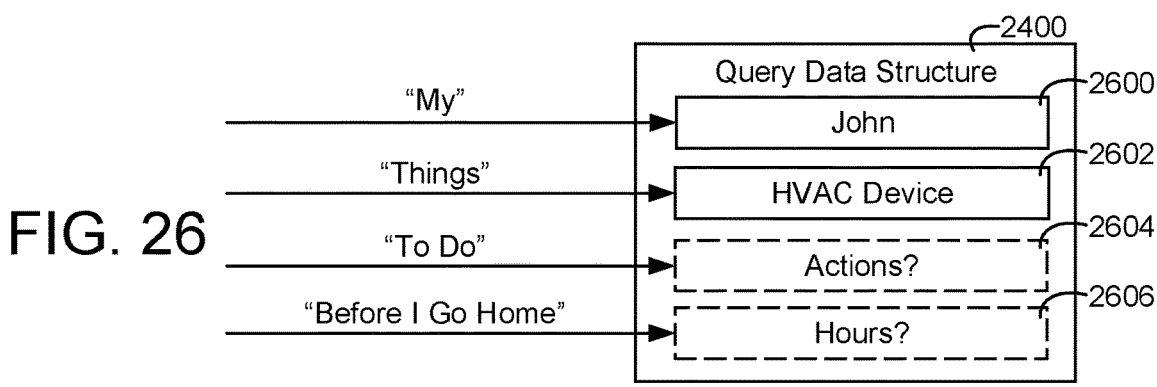
FIG. 26 is the query data structure of FIG. 24 generated based on querying the graph data structure as shown in FIG. 25, according to an exemplary embodiment.

Referring now to FIGS. 25-26, the graph data structure 2300 of FIG. 23 illustrating nodes and edges of the graph data structure 2300 queried by the query engine 502 to build the query data structure 2400 is shown, according to an exemplary embodiment. The query engine 502 can generate the query data structure 2400 based on the components received from the decomposition engine 500, i.e., the components "My," "Things," "To Do," and "Before I Go Home" can be used by the query engine 502 to determine parameters 2600-2606 of the query data structure 2400 indicating that the query should find information related to "John" and "HVAC Device." The query engine 502 can search the graph data structure 2300 for "My" and determine that the user generating the question 2200 is John, represented by node 1402. The query engine 502 can cause the query data structure 2400 to include an indication of the John node 1402, i.e., the parameter 2600.

The query engine 502 may search the graph data structure 2300 and find that the John node 1402 is linked to the HVAC device node 1404 via the isResponsibleFor edge 1432. Based on this relationship, the query engine 502 can set associate the "Things" component with the HVAC device node 1404 and cause the query data structure 2400 to include an indication of the node 1404, i.e., parameter 2602. The component "To Do" may indicate the type of information that the query should return, i.e., fault data or any other information which indicates actions that need to be performed by John indicated by the parameter 2604. The parameter 2604 may indicate that the query should return information pertaining to actions that need to be performed. Furthermore, the query engine 502 may determine that the component "Before I Go Home" corresponds to a particular time. To cause the query data structure 2400 to return the time, the query engine 502 can cause the query data structure 2400 to include the parameter 2606.

Figure 27:
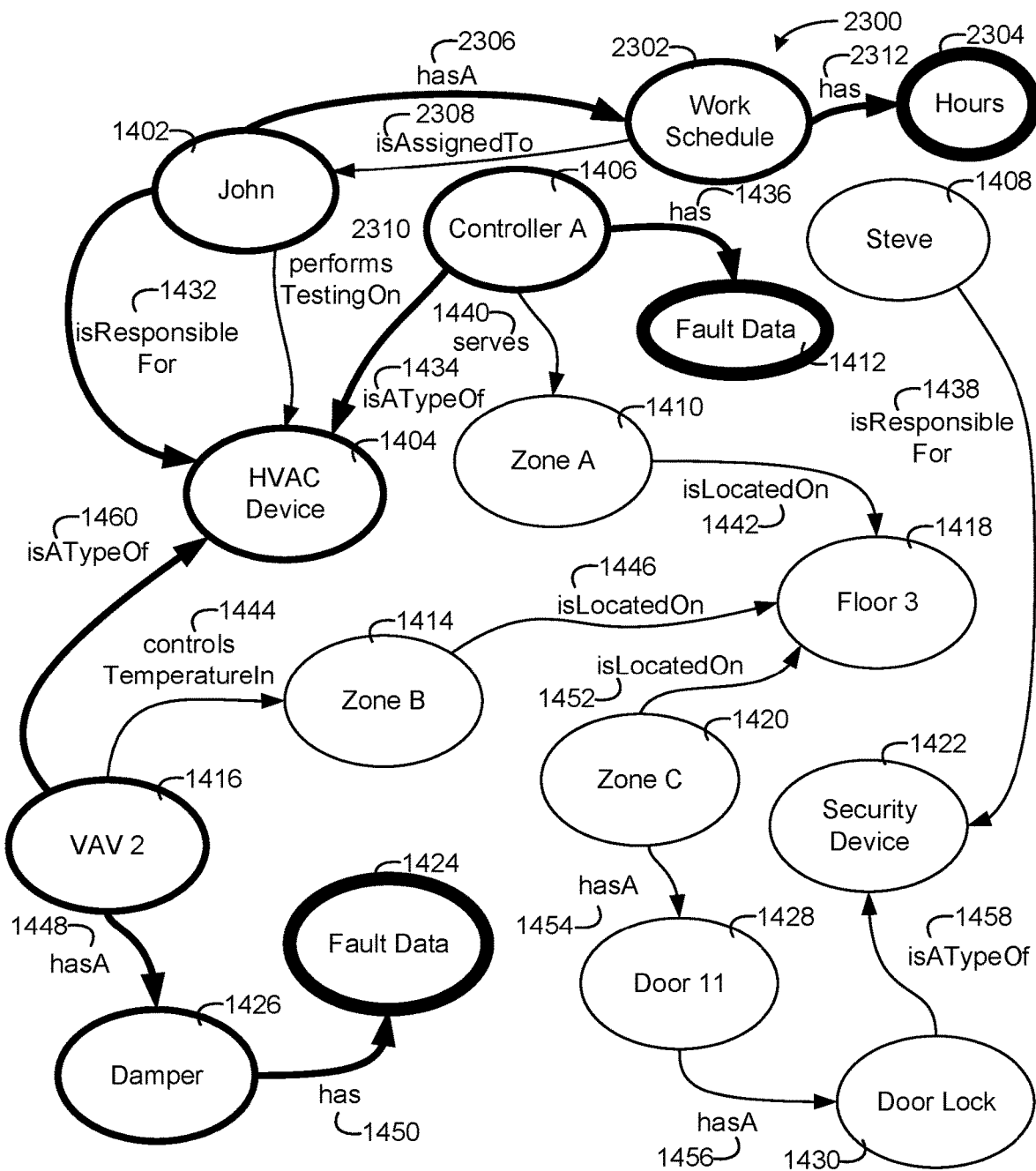
FIG. 27 is the graph data structure of FIG. 24 queried based on the query data structure of FIG. 26 to retrieve fault data, according to an exemplary embodiment.

Referring now to FIG. 27, the graph data structure 2300 queried by the query data structure 2400 is shown, according to an exemplary embodiment. In FIG. 27, the bolded nodes and edges illustrate the nodes and edges traversed in response to the query data structure 2400 while the double bolded nodes, i.e., node 2304, 1412, and 1424, represent the result of the query, i.e., the data returned to the query engine 502. The query data structure 2400 can cause the knowledgebase 118 to return any actionable data linked to both nodes 1402 and 1404, indicated by parameters 2600 and 2602 where the type of information to be returned is indicated by the parameter 2604. Furthermore, the query data structure 2400 can cause the knowledgebase 118 to return the hours associated with the user John indicated by the parameters 2600 and 2606.

Figure 30:
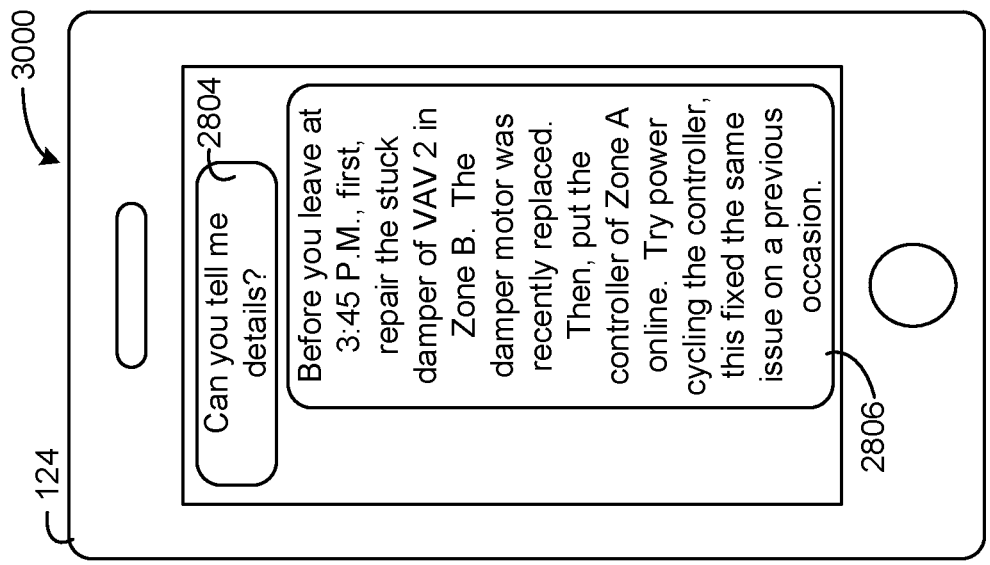
FIGS. 28-30 are examples of a conversation between the user via the user device and the dynamic UX service illustrating the question of FIG. 22 and the response composed for the question of FIG. 22 by the dynamic UX service, according to an exemplary embodiment.
Figure 29:
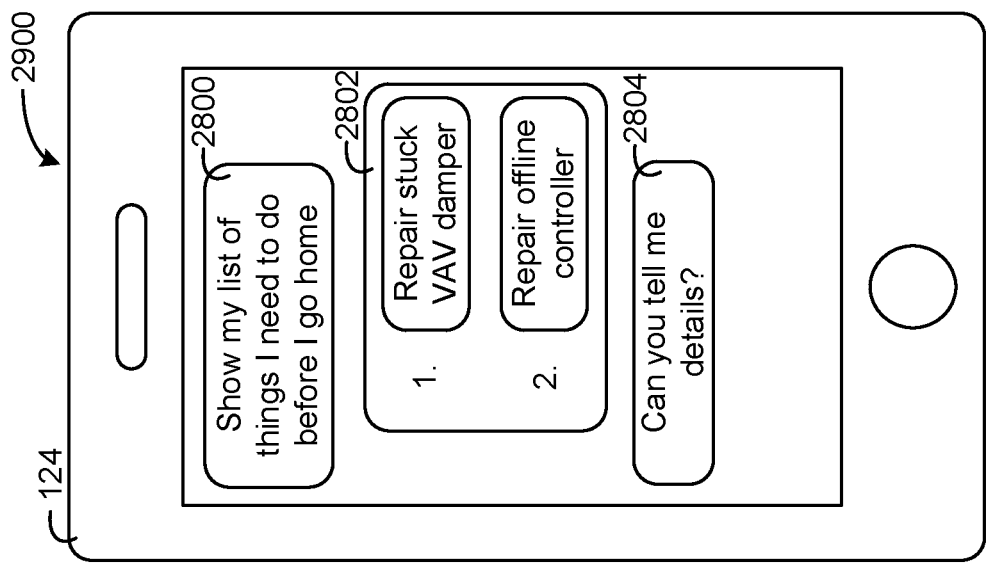
Figure 28:
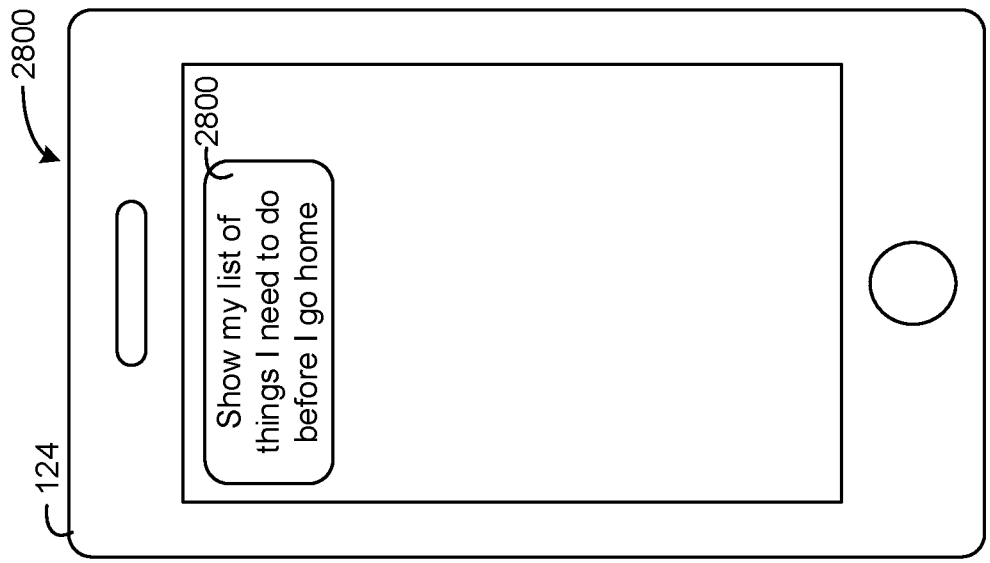

Referring now to FIGS. 28-30, examples 2800-3000 are shown of a conversation between the user via the user device 124 and the dynamic UX service 120 illustrating the question 2200 and the response composed for the question 2200 by the presentation composer 504, according to an exemplary embodiment. In FIG. 28, the user provides a prompt 2800, i.e., "Show my list of things I need to do before I go home," the question 2200. In FIG. 29, in response to the question 2800, the presentation composer 504 sends a presentation to the user device 124 that the user device 124 displays, i.e., the element 2802. The presentation composer 504 formats the response to the question 2200 as a graphic list element of two faults because the user used the phrase "Show me" and "list" in the question 1300. The element 2802 includes a list including two items, a first action to "Repair stuck VAV damper" and second action "Repair offline controller." The "Repair stuck VAV damper" element may be included above the "Repair offline controller" because the damper being stuck may be a high priority than the controller being offline and the user may need to perform the actions in order of priority.

In FIG. 29, the user provide the prompt 2804 asking for additional details on the to-do list of element 2802, i.e., "Can you tell me details." In FIG. 30, the dynamic UX service 120 responds to the prompt 2804 with more details information on the two actions that the user needs to perform, i.e., the element 2806. The elemtn2806 includes a textual description including the proper order for performing the steps, an indication of when the user will be leaving, and historical information regarding the two pieces of equipment of the action list.

Referring again to FIG. 27, in some embodiments, the questions provided by the user device 124, may be questions asked by one user about another user. For example, Steve, represented by the Steve node 1408 in FIG. 27, may ask questions about John, represented by the John node 1402. For example, a question such as, "Does John have any faults to attend to," may cause the fault data node 1412 and/or the fault data node 1424 to be returned. In some embodiments, to return the fault data of John, the system must first confirm that Steve has the ability to view information about John. For example, Steve may be associated with a "Supervisor" role, for example, a node "Supervisor" may exist in the graph data structure 2300 with a relationship "isA" between the Steve node 1408 and the "Supervisor" node. The relation of Steve to the supervisor role can be identified by the query engine 502 to confirm that Steve can view information about John. Similarly, a relationship "manages" may exist between the Steve node 1408 and the John node 1402. The query engine 502 can review the "manages" relationship to confirm that Steve can view information about John.

In some embodiments, when changes are made to the graph data structure 2300 by a first user that affects a second user, the dynamic UX service 120 may push an notification of the update to the user. For example, if John has a window installed in Zone C, represented by the zone C node 1420, the knowledgebase 118 can cause a node "Window" to be added to the graph data structure 2300 along with a relationship "hasA" between the zone C node 1420 and the "Window" node. Because Steve is responsible for security in the Zone C, the dynamic UX service 120 can identify the update to the graph data structure 2300, identify that Steve is related to the Zone C and that a change has been made in Zone C, and generate a presentation for pushing to a user device of Steve.

Figure 31:
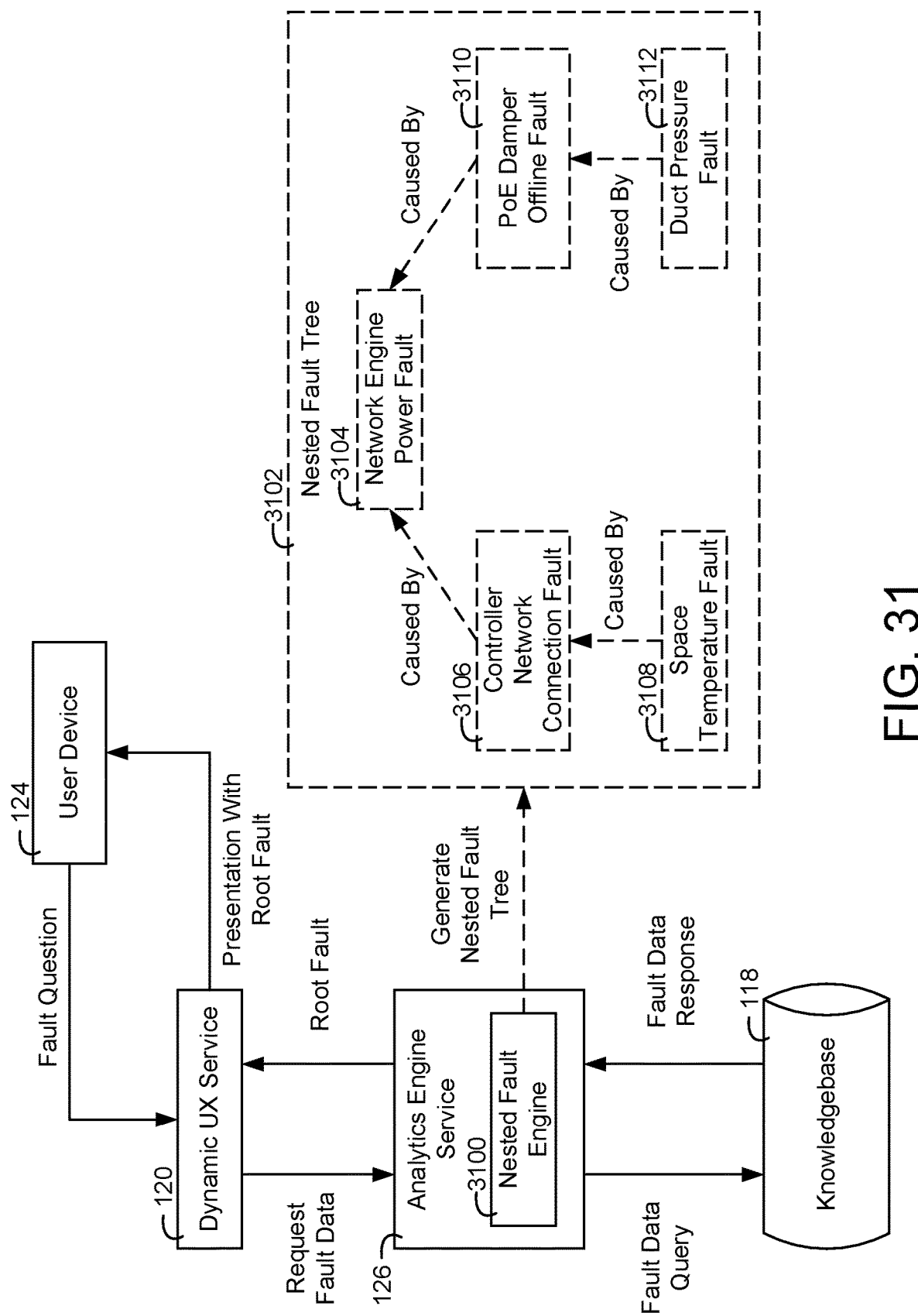
FIG. 31 is a block diagram of the dynamic UX service, the knowledgebase, and the analytics engine service of FIG. 1 generating a nested fault tree for identification of a root fault for presentation to a user, according to an exemplary embodiment.

Referring now to FIG. 31, a block diagram of the dynamic UX service 120 and the analytics engine service 126 generating a presentation with a root fault is shown, according to an exemplary embodiment. In FIG. 31, the analytics engine service 126 includes a nested fault engine 3100. The nested fault engine 3100 can be configured to utilize fault data of the knowledgebase 118 in analyzing multiple faults of a building and/or building subsystem to identify relationships between the faults, i.e., determine whether one fault causes another. The nested fault engine 126 can construct a data structure that represents the relationships between multiple faults indicated by data of the knowledgebase 118.

In some embodiments, a user, via the user device 124 provides a question to the dynamic UX service 120 requesting fault data. For example, the question may be "Show me the faults that I need to address." The dynamic UX service 120 can analyze the fault question and provide a request to the analytics engine service 126. The analytics engine service 126 can respond to the dynamic UX service 120 with a root fault, i.e., a main fault that is responsible for other faults occurring. The dynamic UX service 120 can compose a presentation data structure for presentation to the user via the user device 124. The presentation data structure can include an indication of the root fault. Decomposing a user question and composing a presentation for a user is described in greater detail in FIGS. 1-30.

In some embodiments, rather than providing a question to the dynamic UX service 120, the dynamic UX service 120 may automatically push the presentation with the root fault to the user device 124 without requiring the user to first provide a request or question to the dynamic UX service 120. In this regard, the dynamic UX service 120 may periodically cause the nested fault engine 3100 to identify a root fault that needs to be addressed, identify a user that is responsible for addressing the root fault, and push a presentation with an indication of the root fault to the user.

In some embodiments, the dynamic UX service 120 can communicate with the analytics engine service 126 to cause the analytics engine service 126 to instantiate the nested fault engine 3100. The nested fault engine 3100 can be configured to query the knowledgebase 118 for fault data. In some embodiments, the nested fault engine 3100 queries the knowledgebase 118 for data associated with the user of the user device 124, i.e., for fault data that the user is responsible for servicing. In some embodiments, the nested fault engine 3100 analyzes raw data in the knowledgebase 118 to identify the presence of a fault, i.e., the data may not explicitly indicate a fault but may be raw temperature measurements, network traffic data, heartbeat signals, etc.

The nested fault engine 3100 can analyze a set of identified faults to construct the nested fault tree 3102. In some embodiments, the nested fault engine 3100 may store sets of preconfigured rules that indicate that certain types of faults in one system cause other types of faults in the same system. For example, in a system, a stuck damper of a particular zone may be a first fault and a failure to meet a temperature setpoint for the particular zone may be a second fault. A rule may be stored by the nested fault engine 3100 that indicates that a stuck damper fault causes a temperature setpoint fault. In some embodiments, to apply the rules, e.g., to understand that a particular damper experiencing a fault is associated with a particular zone experiencing a temperature fault, the nested fault engine 3100 can equerry the knowledgebase 118 for contextual information, i.e., for relationships between equipment, people, spaces, etc.

The nested fault tree 3102 may be a data structured stored by the nested fault engine 3100 and/or stored in the knowledgebase 118. The nested fault tree 3102 can be constructed in a relationship form, e.g., graph database form, where the faults are represented as nodes and the edges represent the relationships between the nodes. The nested fault tree 3102 can be a permanent piece of information that is stored and updated as faults occur and are addressed. In some embodiments, the nested fault tree 3102 is stored by the nested fault engine 3100 for the purpose of an analysis and is deleted once the analysis is complete. The nested fault tree 3102 can be recreated by the analytics engine service 126 when another analysis is conducted by the nested fault engine 3100.

The nested fault tree 3102 includes five faults but can include any number of faults with varying numbers of dependencies, i.e., one fault may be caused by another fault, multiple faults can all be caused by one fault, or one fault can be caused by multiple other faults. In the nested fault tree 3102, a network engine power fault 3104 may exist. The network engine power fault 3104 may indicate that a network device that manages a network for a building is experiencing a power issue, i.e., the device is off. Other devices connected to the network that the network engine manages may experiencing errors since they may rely on the network. For example, a controller that receives a temperature setpoint via the network may experience a network connection fault since the network managed by the network engine may be offline. This fault may be indicated by a controller network connection fault 3106. Furthermore, because the controller is not receiving the setpoint, a user requested setpoint may never be delivered to the controller and a space operated by the controller may never reach the user requested setpoint, causing a space setpoint error, i.e., space temperature fault 3108.

A damper of a duct system may be a power over Ethernet (PoE) device and may receive power via the network of the network engine. However, because the network engine is experiencing a power fault, the PoE damper may not receive any power and may cease to operate properly. This may cause the PoE damper to go offline, resulting in the PoE damper offline fault 3110. Because the PoE damper is offline, a duct pressure of a duct that the PoE damper is connected to may not meet a setpoint. Accordingly, a duct pressure fault 3112 may exist.

In response to generating the nested fault tree 3102, the nested fault engine 3100 can select one or multiple root faults for presentation to the user device 124. The nested fault engine 3100 can be configured to communicate the root fault to the dynamic UX service 120. In some embodiments, the nested fault engine 3100 identifies which nodes of the nested fault tree 3102 do not depend from any other faults, the nested fault engine 3100 can select these nodes as the root nodes and provide those nodes to the dynamic UX service 120.

Figure 32:
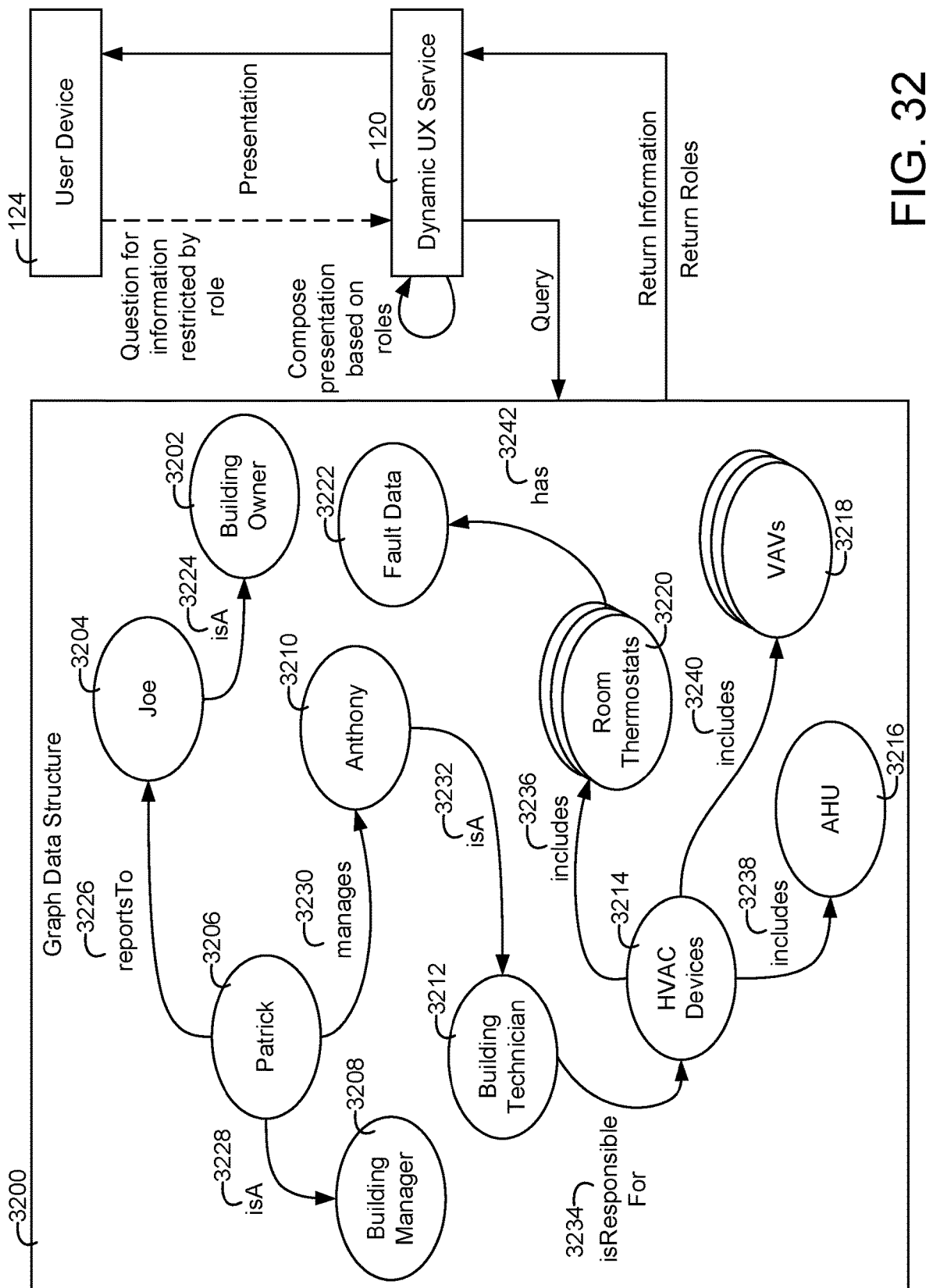
FIG. 32 is a block diagram of a graph data structure that the dynamic UX service of FIG. 1 can query for information, the graph data structure including user roles, according to an exemplary embodiment.

Referring now to FIG. 32, a graph data structure 3200 that the dynamic UX service 120 can query for information is shown, the graph data structure including user roles, according to an exemplary embodiment. The graph data structure 3200 can be an example of the knowledgebase 118 or a component of the knowledgebase 118. The graph data structure 3200 includes multiple nodes and edges, i.e., nodes 3202-3222 and edges 3224-3242. The nodes 3202-3222 represent entities of the building 102, i.e., data, equipment, areas, and the building 102 itself. The edges 3224-3242 represent relationships between the various entities of the building 102.

The nodes 3202-3222 include a Joe node 3204. The Joe node 3204 represents an individual Joe who is a building owner, represented by an isA edge 3224 between the Joe node 3204 and a building owner node 3202. Another node, Patrick node 3206 represents another individual, Patrick. Patrick may report to Joe, i.e., Joe employs Patrick or is otherwise Patrick's superior. This relationship between Patrick and Joe may be represented by a reportsTo edge 3226 from the Patrick node 3206 to the Joe node 3204. While Joe may own the building, Patrick may be responsible for managing the building, i.e., Patrick may be a building manager. This is indicated by an edge isA 3228 between the Patrick node 3206 and a building manager node 3208.

Patrick may supervise a building technician for the building, this building technician may be an individual, Anthony, represented by an Anthony node 3210. The supervision of Anthony by Patrick can be represented by a manages edge 3230 between the Patrick node 3206 and the Anthony node 3210. The graph data structure 3200 can represent Anthony as the building technician based on an isA edge 3232 between the Anthony node 3210 and a building technician node 3212.

The building technician of the building, i.e., Anthony, may have particular responsibilities in the building, for example, maintaining and servicing HVAC devices. The HVAC devices of the building may be represented by an HVAC devices node 3214. Anthony's responsibility for the HVAC devices may be represented by an isResponsibleFor edge 3234 between the building technician node 3212 and the HVAC devices node 3214.

The HVAC devices of the building may include room thermostats, VAVs, and an AHU. The room thermostats can be represented by a set of room thermostat nodes 3220, a set of VAV nodes 3218, and an AHU node 3216. Includes edges 3236, 3240, and 3238 between the HVAC devices node 3214 and the set of room thermostat nodes 3220, the set of VAV nodes 3218, and the AHU node 3216.

FIG. 32 further includes the user device 124 and the dynamic UX service 120. The dynamic UX service 120 can be configured to generate presentations for the user device 124 based on the role information included within the graph data structure 3200. For example, some information should only be surfaced to an appropriate individual. For example, since Patrick manages Anthony, the performance of Anthony, tasks associated with Anthony, etc. can be viewed by Patrick. However, information pertaining to Joe may not be viewable by Patrick since Patrick reports to Joe.

In some embodiments, the presentation that the dynamic UX service 120 generates is initiated by the user device 124 providing the dynamic UX service 120 with a question. The question may be a question for information that is in some way associated with or restricted by roles indicated by the graph data structure 3200. For example, if the question is "What tasks does Anthony have to complete?" this may be restricted based on who Anthony reports to. Another question, "How much does Joe earn?" may also be restricted based on role. The dynamic UX service 120 can query the graph data structure 3200 for both information pertaining to the question received from the user device 124 but also retrieve contextual information indicating how the presentation should be generated or presentation to the user device 124, i.e., the context may be nodes or edges of the graph data structure 3200 that indicate roles of entities of the graph data structure.

For example, the question received by the dynamic UX service 120 may be generated by Patrick. The question may be "show me tasks that Anthony needs to perform." The dynamic UX service 120 can query the graph data structure 3200 to identify tasks associated with Anthony, e.g., the faults linked to the set of room thermostat nodes 3220. The dynamic UX service 120 can further query the graph data structure 3200 for role information pertaining to Patrick and Anthony. For example, the query can return the building manager node 3208 or the building technician node 3212. Furthermore, the query could return an edge, the manages edge 3230 between the Patrick node 3206 and the Anthony node 3210. Based on the returned role data, the dynamic UX service 120 can compose the presentation. Since Patrick manages Anthony, the presentation to Patrick may include all the details of fault data that Anthony needs to handle. However, if another user that does not manage Anthony was to ask the same question, the Dynamic UX service 120 may provide basic information regarding Anthony, i.e., that he is a building technician instead of providing the tasks that Anthony needs to perform. This dynamic composition can control the amount of detail is provided about Anthony.

In some embodiments, information can be proactively pushed to the user device 124 based on role information of the graph data structure 3200. For example, if the fault data 3222 indicates a fault that has not been addressed for a first predefined period of time, the dynamic UX service 120 can determine that Anthony 3210 is responsible for the faults. The dynamic UX service 120 can determine that Anthony is responsible for the faults through the relationships of the graph data structure 3200, i.e. the isA edge 3232 between Anthony 3210 and the building technician node 3212, the isResponsibleFor edge 3234 between the building technician node 3212 and the HVAC devices node 3214, the includes edge 3236 between the HVAC devices node 3214 and the set of room thermostat nodes 3220, and the has edge 3242 between the set of room thermostat nodes 3220 and the fault data node 3222.

If Anthony does not address the fault with a second predefined amount of time, the dynamic UX service 120 can escalate the faults, and the performance of Anthony, to another user. The user that the faults should be escalated to is Patrick and the dynamic UX service 120 can identify Patrick as the appropriate individual to escalate the faults to based on the manages edge 3230 between the Patrick node 3206 and the Anthony node 3210. The dynamic UX service 120 can compose a presentation indicating the faults and Anthony's failure to address the faults and push the presentation to a user device associated with Patrick.

If the faults are still not addressed after a third predefined amount of time, the dynamic UX service 120 can escalate the faults, the performance of Anthony, and the performance of Patrick to another user. The user that the faults should be escalated to is Joe and the dynamic UX service 120 can identify Joe as the appropriate individual to escalate the faults to based on the edge reportsTo 3226 between the Patrick node 3206 and the Joe node 3204. The dynamic UX service 120 can compose a presentation indicating the faults, Anthony's failure to address the faults, and Patrick's failure to address the faults to a user device associated with Joe.

Figure 33:
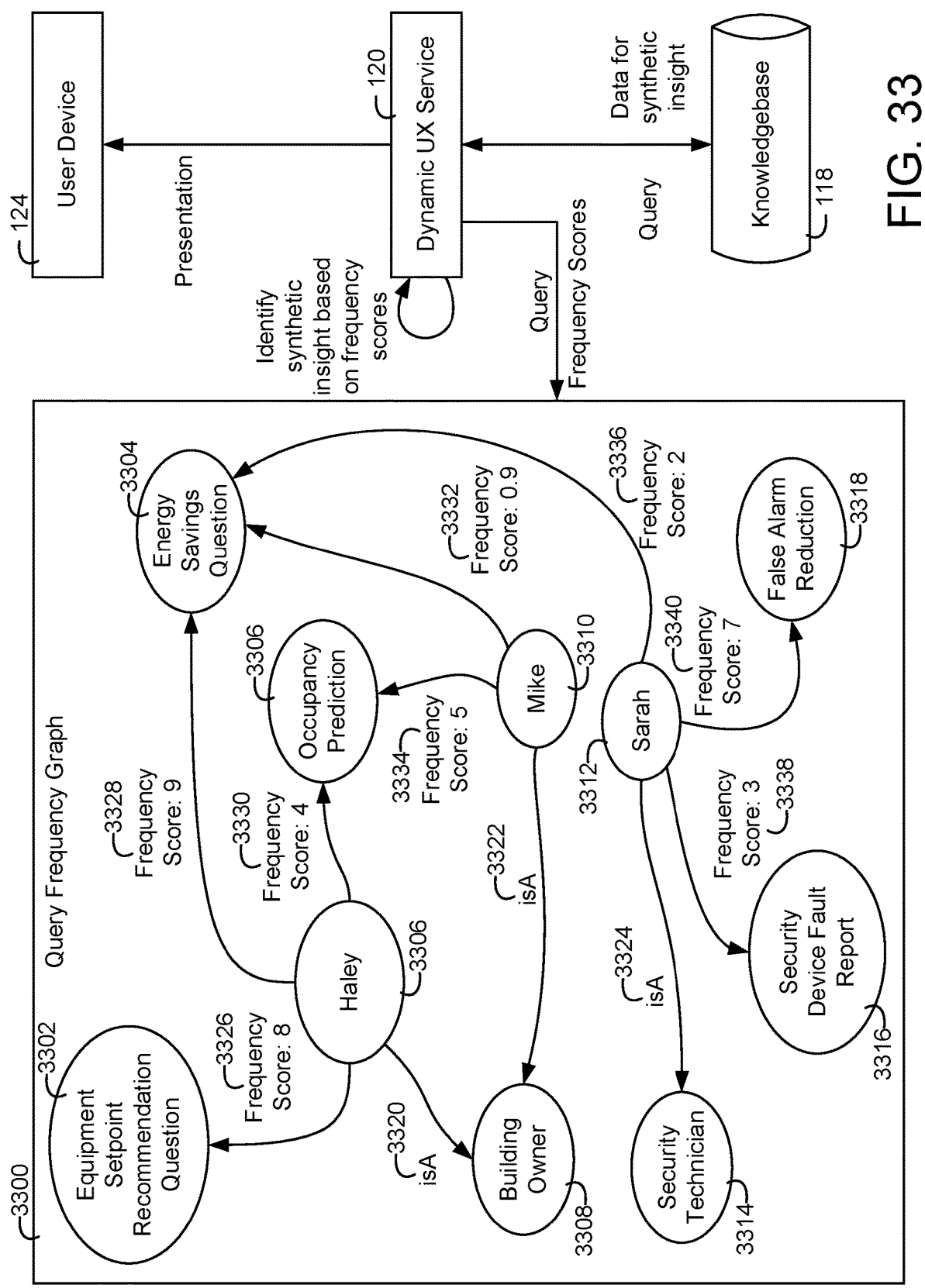
FIG. 33 is a block diagram of a question frequency graph illustrating how often users ask particular questions, according to an exemplary embodiment.

Referring now to FIG. 33, a block diagram of a question frequency graph 3300 including information indicating how often users ask particular questions is shown, according to an exemplary embodiment. The question frequency graph 3300 can be an example of the knowledgebase 118 or a component of the knowledgebase 118. The graph data structure 3330 includes multiple nodes and edges, i.e., nodes 3302-3318 and edges 3328-3340. The nodes 3202-3222 represent entities of a building and types of questions. The edges 3224-3242 represent relationships between the various entities and the frequency scores indicating how often users ask certain types of question.

The nodes 3302, 3304, 3306, 3316, and 3318 represent different types of questions or insights that a user may ask the dynamic UX service 120. The node 3302 may indicate an equipment setpoint recommendation question. Questions that pertain to identifying a value for a setpoint for a space or piece of equipment may be associated with the node 3302. Questions that pertain to determining energy savings for a building or piece of equipment may be associated with the node 3304. Questions that pertain to determine when spaces of a building will be occupied are associated with the node 3306. Questions that pertain to reducing the number of security alarms that are false that occur within a building are associated with the node 3318. Questions that pertain to aggregating information in reports for faults of security devices are associated with the node 3316.

The nodes can further include indications of users, i.e., a user Haley, a user Mike, and a user Sarah. Haley may be associated with the Haley node 3306, Mike may be associated with the Mike node 3310, and Sarah may be associated with the Sarah node 3312. Furthermore, the nodes may indicate role nodes. A building owner role can be represented by the building owner node 3308. A security technician role can be represented by the security technician node 3314. Haley and Mike may both be building owners and thus an isA edge 3320 may exist between the Haley node 3306 and the building owner node 3308 and an isA edge 3322 may exist between the Mike node 3310 and the security technician node 3314. Sarah may be a security technician and thus an isA edge 3324 may exist between the Sarah node 3312 and the security technician node 3314.

Frequency score edges 3326-3330, with particular score values may exist between the Haley node 3306 and the question nodes 3302-3306. Similarly, frequency score edges 3332 and 3334 with particular score values may exist between the Mike node 3310 and the question nodes 3304 and 3306. Furthermore, frequency score edges 3336-3340 may exist with particular score values between the Sarah node 3312 and the question nodes 3304, 3316, and 3318.

In some embodiments, the dynamic UX service 120 generates and/or updates the frequency score edges to include or be values indicating how frequently a user asks a particular question or how interested a user is in a particular question. For example, the scores may be updated as each question is received by the dynamic UX service 120 from the user device 124. For example, the dynamic UX service 120 can identify which question node (i.e., what question topic) a particular question falls under and what user is asking the question. Based on the identification of the user, the score between the node representing the user and the identified question node can be updated to be a new value. In some embodiments, the score indicates a total number of time a user has asked a question. In some embodiments, the score indicates a total number of times a user has asked a question in the last predefined period of time (e.g., in the last day, month, year, etc.).

The dynamic UX service 120 can generate presentations for the user device that include synthetic insights. The dynamic UX service 120 can generate the synthetic insight based on querying a knowledgebase 118 and receiving data for generating the synthetic insight. The type of data required for generating the synthetic insight and the processing for generating the synthetic insight can be determined based on the frequency scores of the query frequency graph 3300.

For example, the dynamic UX service 120 could identify that Mike never asks questions about equipment setpoints, i.e., no edge exists (or an edge with a low score exists). Since Mike is a building owner, the dynamic UX service 120 can identify what questions other building owners are asking, i.e., the dynamic UX service 120 can identify that Haley has a frequency score of "8" for asking the equipment setpoint question. The dynamic UX service 120 can generate a synthetic insight for equipment setpoints and push the synthetic insight to a user device of Mike.

In some embodiments, the dynamic UX service 120 can identify that a user asks a question frequently based on the frequency scores (e.g., a frequency score greater than a predefined amount). For example, Sarah asks questions regarding false alarm reduction frequently, i.e., the frequency score edge 3340 between the Sarah node 3312 and the false alarm reduction node 3318 is a "7." The dynamic UX service 120 can determine that Sarah is interested in reducing false alarms and can query the knowledgebase 118 for data and cause false alarm reduction analytics to be run, even if Sarah does not ask for the analytics to be run. If an insight is identified, the dynamic UX service 120 can push the insight to a user device of Sarah.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted.

Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed:

1. A building system comprising one or more non-transitory storage devices having instructions stored thereon that, when executed by one or more processors, cause the one or more processors to:
receive an unstructured user question from a user device of a user;
query a graph database based on the unstructured user question to extract context associated with the unstructured user question from contextual information of a building stored by the graph database, wherein the graph database stores the contextual information of the building through a plurality of nodes and a plurality of edges between the plurality of nodes, wherein the plurality of nodes represent equipment, spaces, people, and events associated with the building and the plurality of edges represent relationships between the equipment, spaces, people, and events, wherein the one or more processors are configured to extract the context for multiple portions of the unstructured user question across two or more of the equipment, spaces, people, or events;
identify one or more data sources based on the context, the one or more data sources identified by the context as storing data for responding to the unstructured user question;
retrieve the data from the one or more data sources based on the context to generate a response to the unstructured user question;
compose a presentation based on the retrieved data;
receive an indication of the data being ingested into the graph database;
determine, based on the data, that a presentation rule of a plurality of presentation rules is triggered based on the data;
query the graph database based on the presentation rule and the data to identify the user;
compose a second presentation based on the data and the presentation rule; and
push the second presentation to the user device of the user.

2. The building system of claim 1, wherein the one or more data sources are one or more particular nodes of the graph database.

3. The building system of claim 1, wherein the instructions cause the one or more processors to implement:
a data ingestion service configured to collect the data from an edge device of the building and ingest the data into the graph database;
the graph database, wherein the graph database is configured to store the data; and
a dynamic user experience service configured to receive the unstructured user question, query the graph database, and compose the presentation.

4. The building system of claim 1, wherein the unstructured user question is a string;
wherein the instructions cause the one or more processors to:
decompose the string to determine a requested information context and a presentation context based on the string;
query the graph database for the data of the building based on the requested information context; and
compose the presentation based on the data and the presentation context by determining a format of the presentation based on the presentation context.

5. The building system of claim 1, wherein the plurality of nodes represent the data.

6. The building system of claim 1, wherein the unstructured user question is a string comprising an identifier of an edge device associated with the data and an indication of a type of the data;
wherein the instructions cause the one or more processors to:
decompose the string to determine a first component and a second component of the string, wherein the first component is the identifier of the edge device associated with the data and the second component is the type of the data; and
query the graph database for the data of the building with the first component and the second component.

7. The building system of claim 1, wherein the unstructured user question is a string comprising an indication of a requested output presentation, wherein the requested output presentation is at least one of a visual output presentation, a textual output presentation, or an audible output presentation;
wherein the instructions cause the one or more processors to:
decompose the string to determine a component of the string, wherein the component is the indication of the requested output presentation; and
compose the presentation based on the component of the string by:
determining whether the component indicates the visual output presentation, the textual output presentation, or the audible output presentation;
composing the presentation as the visual output presentation in response to a first determination that the component indicates the visual output presentation;
composing the presentation as the textual output presentation in response to a second determination that the component indicates the textual output presentation; and
composing the presentation as the audible output presentation in response to a third determination that the component indicates the audible output presentation.

8. The building system of claim 1, wherein the instructions cause the one or more processors to:
query the graph database for at least a portion of the data and a context portion of the contextual information describing the building;
perform one or more analytic algorithms based on the portion of the data and the context portion of the contextual information to generate one or more analytics results; and
push the one or more analytics results to the user device of the user.

9. The building system of claim 8, wherein the instructions cause the one or more processors to:
retrieve at least one of historical question data associated with the user or user contextual data describing the user; and select the one or more analytic algorithms from a plurality of analytic algorithms based on at least one of the historical question data associated with the user or the user contextual data describing the user.

10. The building system of claim 1, wherein the unstructured user question is a string;
wherein the instructions cause the one or more processors to:
decompose the string to determine a requested information context and a presentation context;
query the graph database for the context based on the requested information context;
generate a query data structure based on the context;
query the graph database based on the query data structure for the data of the building; and
compose the presentation based on the data and the presentation context.

11. The building system of claim 10, wherein the requested information context comprises a request for one or more actions associated with the user of the user device, wherein the requested information context further comprises an indication of the user.

12. The building system of claim 10, wherein the context comprises at least one of one or more particular nodes of the graph database or one or more particular edges of the graph database;
wherein the instructions cause the one or more processors to generate the query data structure by causing the query data structure to include one or more parameters based on at least one of the one or more particular nodes of the graph database or the one or more particular edges of the graph database.

13. The building system of claim 1, wherein the instructions cause the one or more processors to:
retrieve historical question data based on an identity of the user;
identify one or more presentation preferences of the user based on the historical question data; and
compose the second presentation based on the data, the presentation rule, and the one or more presentation preferences.

14. The building system of claim 1, wherein the instructions cause the one or more processors to compose the second presentation based on the data and the presentation rule by:
selecting one presentation template from a plurality of presentation templates based on the data and the presentation rule, wherein each of the plurality of presentation templates defines a presentation format; and
composing the second presentation based on the data and the one presentation template.

15. A method comprising:
receiving, by a processing circuit, an unstructured user question from a user device of a user;
querying, by the processing circuit, a database based on the unstructured user question to extract context associated with the unstructured user question from contextual information of a building stored by the database, wherein the database stores the contextual information of the building through a plurality of nodes and a plurality of edges between the plurality of nodes, wherein the plurality of nodes represent equipment, spaces, people, and events associated with the building and the plurality of edges represent relationships between the equipment, spaces, people, and events, wherein the querying comprises extracting the context for multiple portions of the unstructured user question across two or more of the equipment, spaces, people, or events;
identifying, by the processing circuit, one or more data sources based on the context, the one or more data sources identified by the context as storing data for responding to the unstructured user question;
retrieving, by the processing circuit, the data from the one or more data sources based on the context to generate a response to the unstructured user question;
composing, by the processing circuit, a presentation based on the retrieved data;
receiving, by the processing circuit, an indication of the data being ingested into the database;
determining, by the processing circuit, based on the data, that a presentation rule of a plurality of presentation rules is triggered based on the data;
querying, by the processing circuit, the database based on the presentation rule and the data to identify the user;
composing, by the processing circuit, a second presentation based on the data and the presentation rule; and
pushing, by the processing circuit, the second presentation to the user device of the user.

16. The method of claim 15, wherein the unstructured user question is a string;
wherein the method further comprises:
decomposing, by the processing circuit, the string to determine a requested information context and a presentation context based on the string;
querying, by the processing circuit, the database for the data of the building based on the requested information context; and
composing, by the processing circuit, the presentation based on the data and the presentation context by determining a format of the presentation based on the presentation context.

17. The method of claim 15, wherein the plurality of nodes represent the data.

18. The method of claim 15, wherein the database is a graph database;
wherein the one or more data sources are one or more particular nodes of the graph database.

19. The method of claim 15, wherein the unstructured user question is a string comprising an identifier of an edge device associated with the data and an indication of a type of the data;
wherein the method further comprises:
decomposing, by the processing circuit, the string to determine a first component and a second component of the string, wherein the first component is the identifier of the edge device associated with the data and the second component is the type of the data; and
querying, by the processing circuit, the database for the data of the building with the first component and the second component.

20. The method of claim 15, wherein the unstructured user question is a string comprising an indication of a requested output presentation, wherein the requested output presentation is at least one of a visual output presentation, a textual output presentation, or an audible output presentation;
wherein the method further comprises:
decomposing, by the processing circuit, the string to determine a component of the string, wherein the component is the indication of the requested output presentation; and
composing, by the processing circuit, the presentation based on the component of the string by:

determining whether the component indicates the visual output presentation, the textual output presentation, or the audible output presentation;

composing the presentation as the visual output presentation in response to a first determination that the component indicates the visual output presentation;

composing the presentation as the textual output presentation in response to a second determination that the component indicates the textual output presentation; and composing the presentation as the audible output presentation in response to a third determination that the component indicates the audible output presentation.

21. The method of claim 15, further comprising:
querying, by the processing circuit, the database for at least a portion of the data and a context portion of the contextual information describing the building;
performing, by the processing circuit, one or more analytic algorithms based on the portion of the data and the context portion of the contextual information to generate one or more analytics results; and
pushing, by the processing circuit, the one or more analytics results to the user device of the user.

22. The method of claim 21, further comprising:
retrieving, by the processing circuit, at least one of historical question data associated with the user or user contextual data describing the user; and
selecting, by the processing circuit, the one or more analytic algorithms from a plurality of analytic algorithms based on at least one of the historical question data associated with the user or the user contextual data describing the user.

23. The method of claim 15, wherein the unstructured user question is a string;
wherein the method further comprises:
decomposing, by the processing circuit, the string to determine a requested information context and a presentation context;
querying, by the processing circuit, the database for the context based on the requested information context;
generating, by the processing circuit, a query data structure based on the context;
querying, by the processing circuit, the database based on the query data structure for the data of the building; and
composing, by the processing circuit, the presentation based on the data and the presentation context.

24. The method of claim 23, wherein the requested information context comprises a request for one or more actions associated with the user of the user device, wherein the requested information context further comprises an indication of the user.

25. The method of claim 23, wherein the context comprises at least one of one or more particular nodes of the database or one or more particular edges of the database;
wherein the method further comprises generating, by the processing circuit, the query data structure by causing the query data structure to include one or more parameters based on at least one of the one or more particular nodes of the database or the one or more particular edges of the database.

26. The method of claim 15, further comprising
retrieving, by the processing circuit, historical question data based on an identity of the user;
identifying, by the processing circuit, one or more presentation preferences of the user based on the historical question data; and
composing, by the processing circuit, the second presentation based on the data, the presentation rule, and the one or more presentation preferences.

27. A building management system of a building comprising:
one or more storage devices configured to store instructions and store a knowledgebase comprising contextual information of the building, wherein the contextual information comprises representations of equipment, spaces, people, and events associated with the building and relationships between the equipment, spaces, people, and events; and
one or more processing circuits configured to execute the instructions causing the one or more processing circuits to:
receive an unstructured user question from a user device of a user;
query the knowledgebase based on the unstructured user question to extract context associated with the unstructured user question from the contextual information of the building stored by the knowledgebase, wherein the one or more processing circuits are configured to extract the context for multiple portions of the unstructured user question across two or more of the equipment, spaces, people, or events;
identify one or more data sources based on the context, the one or more data sources identified by the context as storing data for responding to the unstructured user question;
retrieve the data from the one or more data sources based on the context to generate a response to the unstructured user question;
compose a presentation based on the retrieved data;
receive an indication of the data being ingested into the knowledgebase;
determine, based on the data, that a presentation rule of a plurality of presentation rules is triggered based on the data;
query the knowledgebase based on the presentation rule and the data to identify the user;
compose a second presentation based on the data and the presentation rule; and
push the second presentation to the user device of the user.

28. The building management system of claim 27, wherein the knowledgebase is a digital twin that provides a virtual representation of the equipment, spaces, people, and events associated with the building.

* * * * *